(12) United States Patent
Schmidt et al.

(10) Patent No.: US 10,448,112 B2
(45) Date of Patent: Oct. 15, 2019

(54) MANAGING COLLECTIONS OF EPISODIC MEDIA CONTENT

(71) Applicant: TiVo Solutions Inc., San Carlos, CA (US)

(72) Inventors: Margret Schmidt, Redwood City, CA (US); Alex Liston, Menlo Park, CA (US); Nicholas Lovell, Mountain View, CA (US); Richard Alcazar, San Jose, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 15/417,190

(22) Filed: Jan. 26, 2017

(65) Prior Publication Data

US 2017/0214975 A1    Jul. 27, 2017

Related U.S. Application Data

(60) Provisional application No. 62/287,869, filed on Jan. 27, 2016.

(51) Int. Cl.
*H04N 21/482* (2011.01)
*H04N 21/231* (2011.01)
*H04N 21/472* (2011.01)
*H04N 21/433* (2011.01)
*H04N 21/4147* (2011.01)

(52) U.S. Cl.
CPC ..... *H04N 21/482* (2013.01); *H04N 21/23109* (2013.01); *H04N 21/4147* (2013.01); *H04N 21/4334* (2013.01); *H04N 21/47217* (2013.01)

(58) Field of Classification Search
CPC .......... H04N 21/482; H04N 21/23109; H04N 21/4147; H04N 21/4334
See application file for complete search history.

(56) References Cited

U.S. PATENT DOCUMENTS

| | | | |
|---|---|---|---|
| 8,271,334 B1* | 9/2012 | Funk | G06Q 30/0639 705/14.11 |
| 2007/0130158 A1* | 6/2007 | LaBiche | H04L 29/06027 |
| 2007/0157260 A1* | 7/2007 | Walker | H04N 7/163 725/86 |
| 2012/0297421 A1* | 11/2012 | Kim | H04N 5/445 725/41 |
| 2013/0347037 A1* | 12/2013 | Soroushian | H04N 21/26258 725/39 |

* cited by examiner

*Primary Examiner* — Sumaiya A Chowdhury
(74) *Attorney, Agent, or Firm* — Haley Guiliano LLP

(57) ABSTRACT

A media content management system that enables users to manage media content collections is disclosed. A media device is configured to receive requests to create media content collections for particular media content and, in response, to retrieve information related to the media content, and to generate one or more interfaces displaying information about created media content collections. In an embodiment, retrieving information related to a media content may include determining, for one or more episodes of the media content, whether the episode is available from various content sources, including both broadcast and broadband content sources. By enabling a media device to automatically retrieve and present information related to the availability of media content episodes across any number of different broadcast and broadband sources, users can more easily interact with and view information about particular media content of interest to the users.

27 Claims, 15 Drawing Sheets

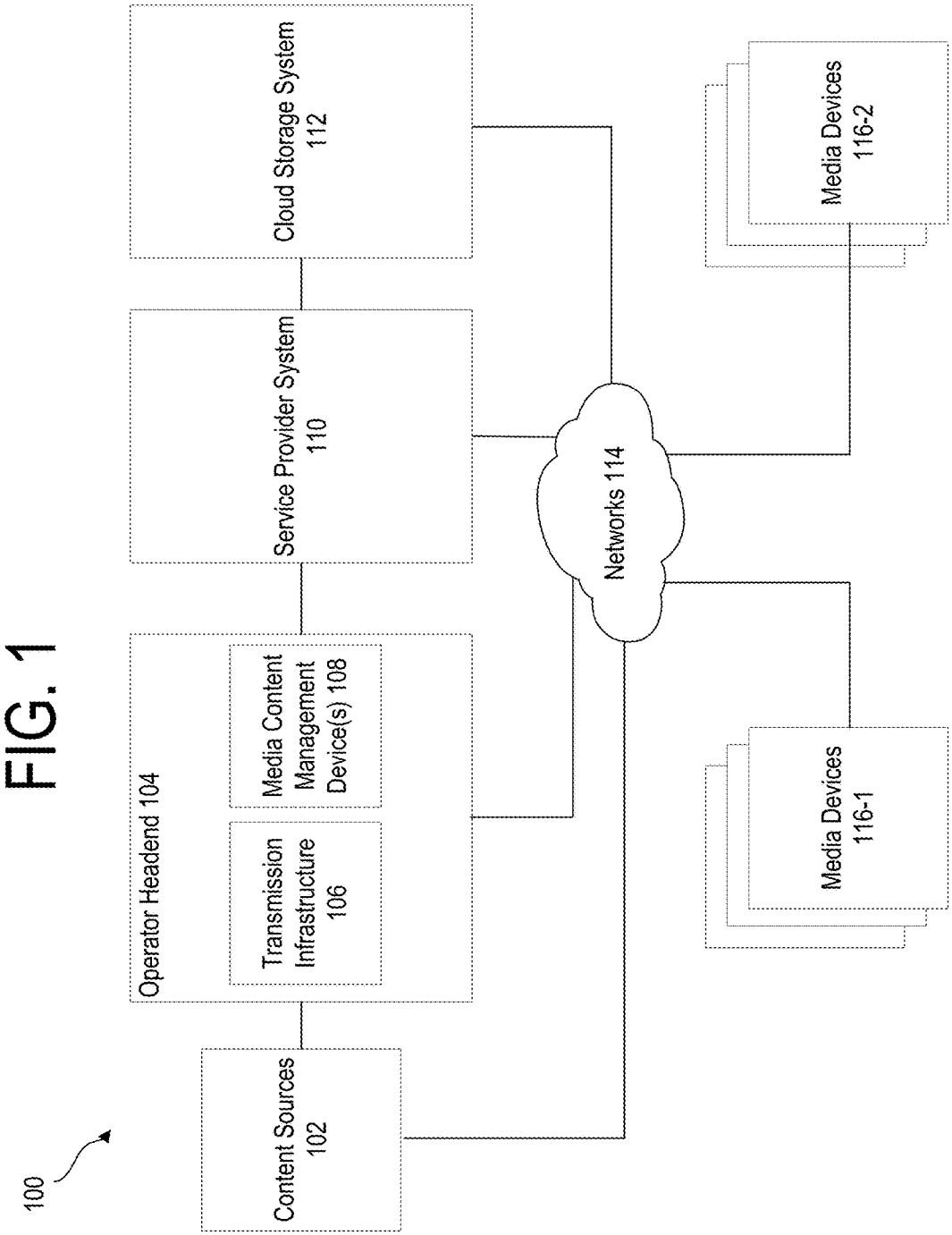

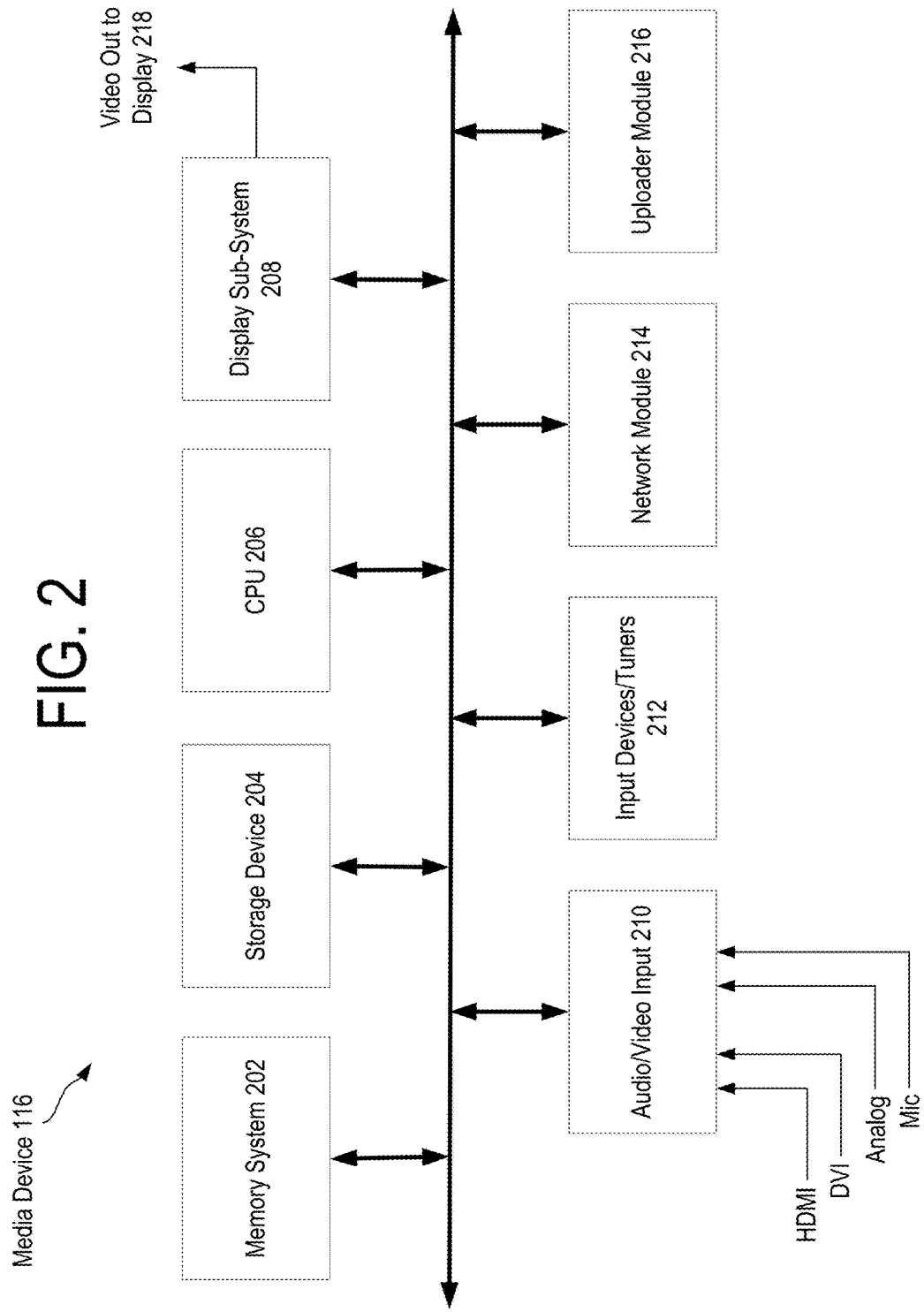

FIG. 3

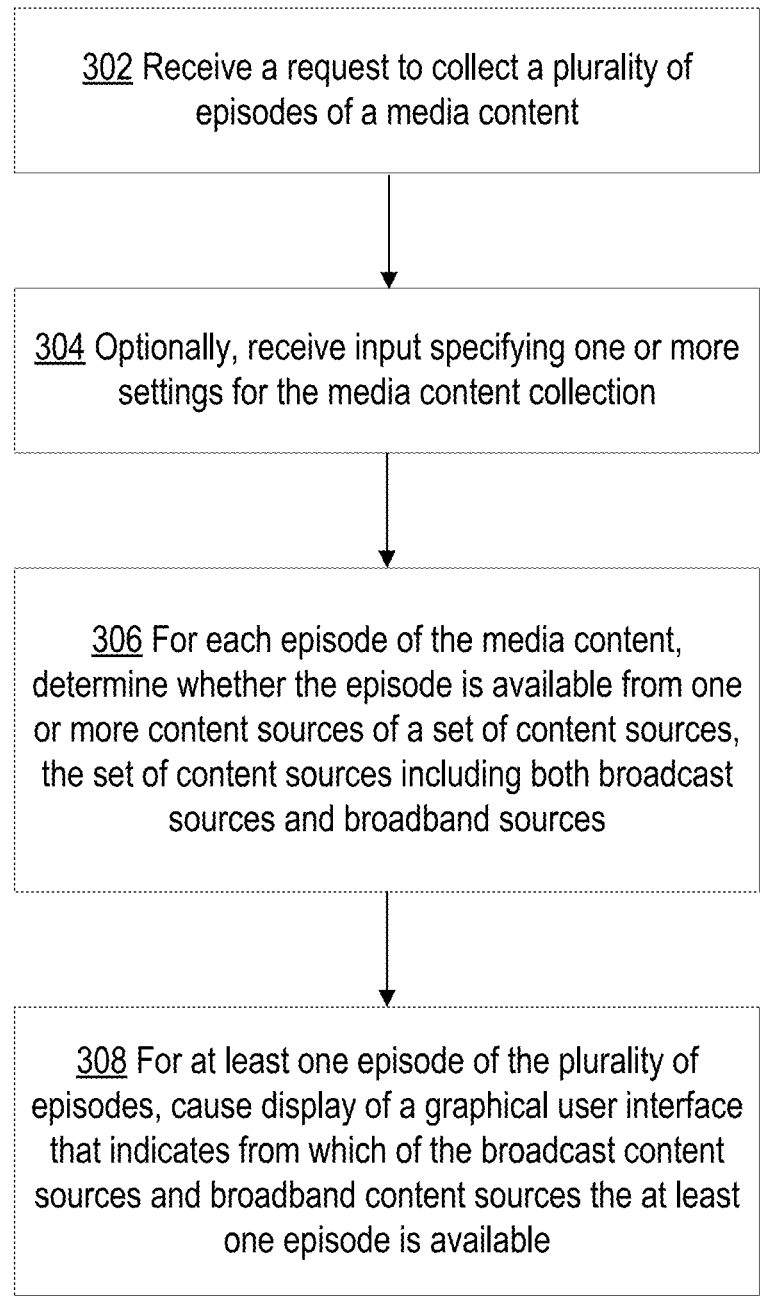

302 Receive a request to collect a plurality of episodes of a media content

304 Optionally, receive input specifying one or more settings for the media content collection 306 For each episode of the media content, determine whether the episode is available from one or more content sources of a set of content sources, the set of content sources including both broadcast sources and broadband sources 308 For at least one episode of the plurality of episodes, cause display of a graphical user interface that indicates from which of the broadcast content sources and broadband content sources the at least one episode is available

MANAGING COLLECTIONS OF EPISODIC MEDIA CONTENT

CROSS-REFERENCE TO RELATED APPLICATIONS; BENEFIT CLAIM

This application claims benefit under 35 U.S.C. § 119(e) to U.S. Provisional Application 62/287,869, filed Jan. 27, 2016, the entire contents of each are hereby incorporated by reference for all purposes as if fully set forth herein. The applicant hereby rescinds any disclaimer of claim scope in the parent application(s) or the prosecution history thereof and advise the USPTO that the claims in this application may be broader than any claim in the parent application(s).

TECHNICAL FIELD

Embodiments relate generally to managing collections of episodic media content by media devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital Video Recorders (DVRs) and other media devices enable users to record and view media content, among many other features. Typically, a DVR includes a hard disk drive or other integrated storage device on which media content items may be recorded. For example, if a user desires to record a television program for later or repeated viewings, the user may provide input to the DVR instructing the DVR to record a copy of the television program. The user may then instruct the DVR to play the recorded copy of the television program from local storage at a later time.

Many types of media content of interest to media users are episodic or series-based, where a number of related episodes of the same media content may be individually broadcast or otherwise made available to viewers over a span of months or years. For example, many television programs are broadcast as a series of separate episodes over one or possibly several seasons of episodes. As another example, a particular sports team may be associated with several broadcasted sporting events over a period of time corresponding to a sports season. If a user desires to view and/or record one episode of such a media content, often the user may also have an interest in other episodes of the same media content. However, scheduling separate recordings for each individual episode is an inconvenient task and may often result in missed recordings or other difficulties. Furthermore, each episode of a media content may be available at any given time from any of several different content sources (e.g., television broadcasts, third-party streaming content providers, Video on Demand (VOD) libraries, etc.), further making it difficult for users to readily find available episodes of particular media content of interest.

BRIEF DESCRIPTION OF THE DRAWINGS

In the drawings:

FIG. 1 is a block diagram of an example system for managing collections of episodic media content, in accordance with one or more embodiments;

FIG. 2 is a block diagram of an example media device, in accordance with one or more embodiments;

FIG. 3 depicts an example flow diagram for creating and causing display of media content collections, in accordance with the disclosed embodiments;

DETAILED DESCRIPTION

Figure 4:
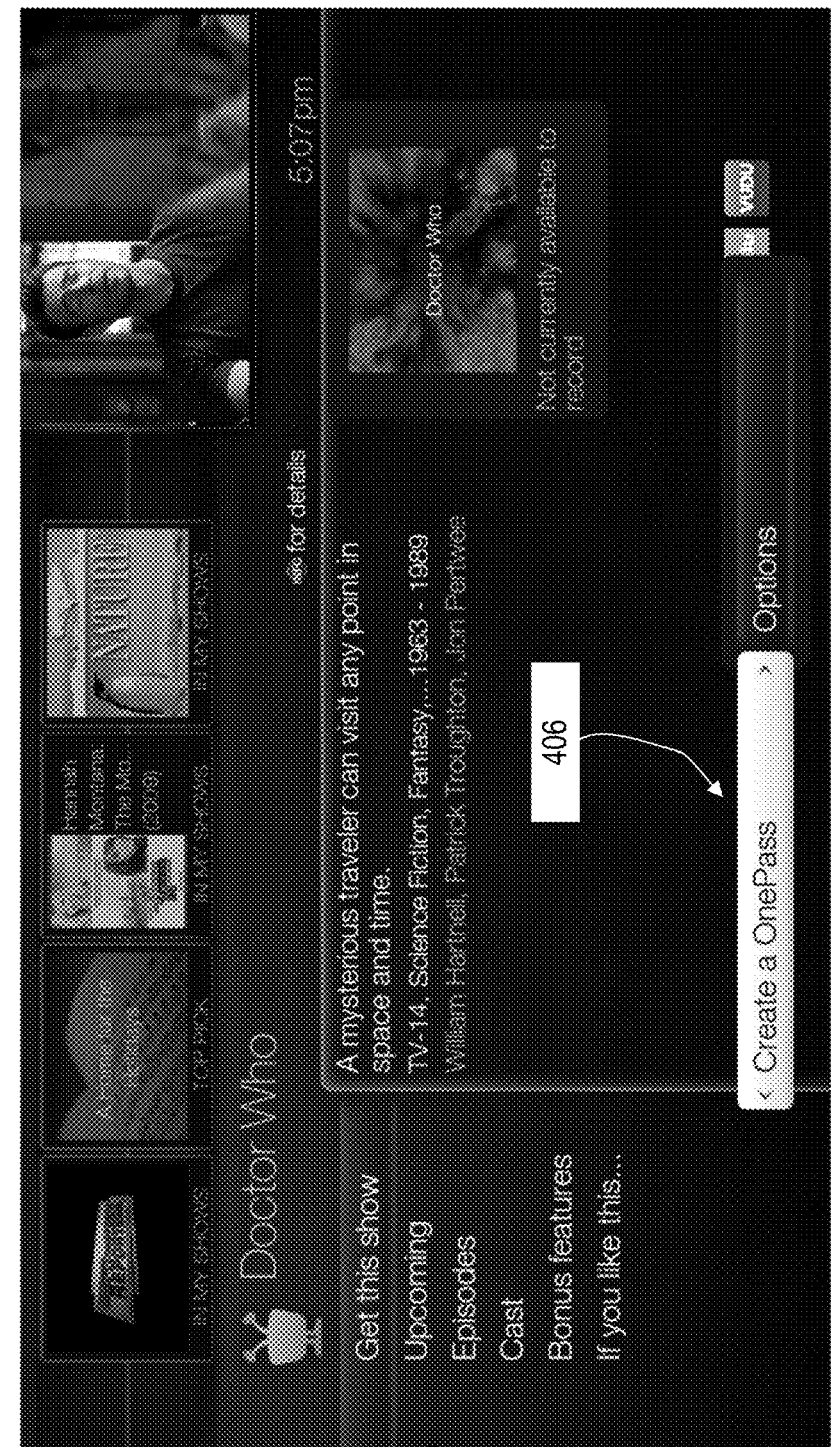
FIG. 4 illustrates an example interface for creating a media content collection based on a media content item, in accordance with the disclosed embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
  2.0. Structural Overview
  3.0. Functional Overview
    3.1. Creating Media Content Collections
    3.2. Displaying Media Content Collections
    3.3. Configuring Media Content Collections 4.0. Example Embodiments
5.0. Implementation Mechanism—Hardware Overview
6.0. Extensions and Alternatives

1.0. GENERAL OVERVIEW

Approaches, techniques, and mechanisms are disclosed that enable users of media devices to manage collections of media content that is episodic, series-based, or otherwise multi-part. In this context, a collection of media content may include, for example, a number of episodes or separate media content items related an ongoing broadcast television series, miniseries, on-demand media content series, series of televised sporting events, or any other type of media content.

According to an embodiment, a media device is configured to receive requests to create media content collections for particular media content and, in response, to retrieve information related to the media content. The media device may be further configured to generate one or more interfaces displaying information about created media content collections. In an embodiment, retrieving information related to a media content may include determining, for each episode of the media content, whether the episode is available from various content sources, including both broadcast and broadband content sources. By enabling a media device to automatically retrieve and present information related to the availability of media content episodes across any number of different broadcast and broadband sources, users can more easily interact with and view information about particular media content of interest to the users.

As one example of when a user may desire to create a media content collection, consider a television program that has aired for several seasons and which is scheduled to air one or more additional seasons in the future. A media device user may become interested in the television program at some point during the run of the television program, for example, after the user views one or more episodes of the television program, or in response to receiving a recommendation from a friend. According to embodiments described herein, in response to the user's interest in the television program, the user may use a media device to create a media content collection for the television program. Among other features described herein, the media content collection may be configured to automatically record future episodes of the television program and to create various interfaces displaying information about recorded episodes organized by season or other groupings. Furthermore, according to one embodiment, the media device may determine the availability of past and/or future episodes of the television program from any of a number of broadcast and broadband content sources, including third-party streaming content providers (e.g., Netflix, Amazon Prime, Hulu, VUDU, etc.), Video on Demand (VOD) libraries, web-based content, and any other available content sources. In this manner, media content collections may be used to present a user's options for viewing episodes of media content across past and future episodes, across different seasons, and across any of a number of different content sources, among other features.

In other aspects, the invention encompasses a computer apparatus and a computer-readable medium configured to carry out the foregoing techniques.

2.0. STRUCTURAL OVERVIEW

2.1. System Overview

FIG. 1 is a block diagram of an example system 100 that may be used to implement a media content management system, in accordance with one or more embodiments. System 100 comprises one or more computing devices and these one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, a system 100 includes one or more media devices 116, including media devices 116-1 and media devices 116-2. As used herein, a media device 116 generally refers to any type of computing device that is capable of receiving media content items, such as television programs, movies, streaming content, video on demand (VOD) content, etc., from a cable signal, terrestrial signal, digital network-based data, etc. In FIG. 1, for example, a media device 116-1 may include a TV-tuner input that can be used to play, record, stream, and/or otherwise access media content items received from one or more content sources 102. Content sources 102 generally may include broadcast content sources and/or broadband content sources. For example, one content source 102 may include a live television broadcast feed that is provided by a cable operator. Other example content sources 102 include, but are not limited to, Video On Demand (VOD) libraries, third party content providers (e.g., Netflix®, Amazon Prime®, etc.), web-based media content, satellite broadcast content, terrestrial broadcast content, etc. Example media devices 116-1 include, but are not limited to, a set-top box (STB), digital video recorders (DVRs), personal computers, tablet computers, handheld devices, televisions, and other computing devices.

In an embodiment, system 100 may further include one or more IP-enabled media devices 116-2. In general, an IP-enabled media device 116-2 may refer to any type of computing device that is capable of receiving media content over one or more networks 114, such as the public Internet, intranet, LAN, WAN, etc., but which may or may not include a TV-tuner input. Examples of media devices 116-2 include, without limitation, STBs, DVRs, personal computers, smartphones, tablets, laptops, game devices, media servers, digital media receivers, televisions, terrestrial antennas, etc. A typical user may own several media devices 116, which may be located and used at various locations throughout the user's home and elsewhere.

In an embodiment, media devices 116 are coupled to content sources 102, operator headends 104, service provider systems 110, and/or cloud storage systems 112 via one or more networks 114. Networks 114 broadly represent one or more cable networks, LANs, WANs, cellular networks (e.g., LTE, HSPA, 3G, older technologies, etc.), and/or internetworks using any of wired, wireless, terrestrial microwave, or satellite links, and may include the public Internet. Furthermore, each media device 116 may be coupled to one or more other media devices via one or more networks 114.

As described in more detail hereinafter, each media device 116 generally may be configured to perform one or more actions related to media content items, including receiving media content items from content sources 102, playing media content items, scheduling recordings of media content items, uploading all or portions of media content items to a cloud storage system, streaming media content items to other media devices, etc. In an embodiment, a service provider system 110 generally may provide content listing information, content availability information, and other information about media content items. A service provider system 110 may also manage cloud-based storage of media content items and provide media devices controlled access to media content items via one or more networks 114.

In an embodiment, an operator headend 104 generally represents a system for receiving and processing broadcast television signals and other media content signals from one or more content sources 102, and for distributing media content based on the media content signals to media devices 116. As one example, an operator headend 104 may represent a cable television headend that receives and processes signals (e.g., received via satellite, coaxial cable, microwave link, fiber-optics, the Internet, etc.) from broadcast content sources 102, and distributes the processed video content to media devices 116 using a transmission infrastructure 106. Transmission infrastructure 106 generally may include components capable of transmitting media content items using any number of encoding and transmission formats including, but not limited to, quadrature amplitude modulation (QAM), Advanced Television Systems Committee (ATSC), satellite, Digital Video Broadcasting-Terrestrial (DVB-T), IP-based transmission over one or more networks, etc.

In one embodiment, an operator headend 104 may host one or more media content management devices 108. In general, media content management devices 108 may include one or more computing devices and storage components configured to store media content items and to provide access to the media content items by media devices 116. In an embodiment, user accounts associated with the media content management system may be provided with an amount of storage at media content management devices 108 to store media content items selected for recording. The user accounts, for example, may be created and managed by a service provider system 110, and each user account may be associated with one or more media devices 116 (e.g., based on a user account login at the media devices). Media content items stored at media content management devices 108 may be delivered to media devices 116 by the operator headend 104 using a transmission infrastructure 106.

In an embodiment, a media content management system may further include one or more cloud storage systems 112. In general, a cloud storage system 112 represents a data storage system that is accessible to media devices 116 via one or more networks (e.g., a network 114) and is typically owned and managed by an entity other than a user of the media device 116. In an embodiment, a cloud storage system 112 may be managed and operated by an operator of a service provider system 110, or a cloud storage system 112 may be operated by a third-party entity. Examples of third-party cloud storage systems include Amazon Web Services (AWS), Microsoft Azure, Google Cloud Storage, etc. Similar to storage available at an operator headend 104, user accounts associated with a service provider system 110 may be provided with an amount of storage space at cloud storage system 112. The amount of storage available to each user account at media content management devices 108 and/or cloud storage system 112 may be presented to users as a single pool of available data storage or, in other examples, a user may be able to separately manage storage available at media content management devices 108 and at a cloud storage system 112.

In one embodiment, a cloud storage system 112 generally may be used to store media content items selected for recording by users of media devices 116 (e.g., as individual scheduled recordings or as part of a media schedule associated with a media content collection). Media content items stored in cloud storage system 112 may be made available to users of media devices 116 until the media content items are selected for deletion by a user, exceed a cloud storage deletion policy, or based on any other deletion policy. In one embodiment, media content received by the operator headend 104 from content sources 102 may be delivered to the cloud storage system 112 via a fixed-bandwidth line to facilitate storage of media content items selected for recording by users.

In an embodiment, a service provider system 110 comprises one or more computing devices generally configured to manage requests from media devices 116 (e.g., media content information and search requests, recording requests, playback requests, content deletion requests, pause point management across devices, etc.), and to manage storage of media content items across one or more operator headends 104 and cloud storage systems 112, among other services and features described herein.

Based on various factors, it may be more efficient at times to stream stored media content items to media devices 116 from media content management devices 108 at an operator headend 104 instead of from a cloud storage system 112, and vice versa. For example, a transmission infrastructure 106 of an operator headend 104 typically may be more reliable and have greater bandwidth capacity than networks available for transmitting media content items from a cloud storage system 112 to media devices 116. However, a transmission infrastructure 106 may not be capable of transmitting media content items to some types of media devices 116 (e.g., mobile devices that are not connected to the transmission infrastructure 106) and some media content formats may not be suitable for transmission by an operator headend 104. In these and other instances, for example, it generally may be more efficient to stream the media content items from a cloud storage system 112.

To facilitate streaming of media content items from either an operator headend 104 or cloud storage system 112 when appropriate, in one embodiment, a service provider system 110 may be configured to determine which media content items to store at the operator headend 104, which media content items to store at cloud storage systems 112, or both. For example, a service provider system 110 may determine which media content items selected for recording by one or more users are most likely to be viewed within a particular amount of time or with a particular frequency. For media content items which it is determined are likely to be watched soon after the items are selected for recording, for example, those items may be stored at the operator headend 104. Storage of these items at the operator headend 104, for example, may enable use of the more robust transmission infrastructure 106 for delivery of the media content items to media devices 116. In contrast, media content items that are determined to be unlikely to be viewed in the near future, or are likely to be viewed on media devices that are not connected to a transmission infrastructure 106, may be stored at a cloud storage system 112.

Example criteria that a service provider system 110 may use to determine where to store media content items include information about particular media content items and historical data for one or more user accounts. For example, the criteria may include an age of the media content item (e.g., measured from an original air date), a user's recent viewing behavior (e.g., whether the user recently watched an earlier episode in the same series and from which device(s) the user viewed the episodes), an overall popularity of the media content items across all user accounts, the aggregated viewing habits across media devices 116 in a particular household, a rate at which a user is currently viewing episodes in a series and the number of episodes remaining, etc.

In one embodiment, a service provider system 110 may use various criteria such as the example criteria described above to generate a weighting factor, also referred to herein as a relevancy factor, for each media content item selected for recording by a user account. For example, a relevancy factor may indicate for each media content item a likelihood that a request to play the media content item is received within the next N days, or within some other time period. A relevancy factor may be generated for each media content item relative to an entire populations of user accounts, a targeted group of user accounts, or for individual user accounts. In an embodiment, the relevancy factors may be used to determine where to store particular media content items (e.g., at an operator headend 104 and/or cloud storage system 112), video and/or audio formats in which to store particular media content items, bit rates at which to store and/or transmit particular media content items, etc. In an embodiment, a relevancy factor may be used to determine if and when to generate and store transcoded versions of particular media content. For example, if a user pauses a media content item being viewed in the user's home, depending on a relevancy factor associated with the media content item, a transcoded version of the media content item may be generated and stored in the cloud storage system 112, the transcoded version suitable for playing on a mobile device. As another example, depending on a relevancy factor, a service provider system 110 may decide to maintain in storage only a single low bitrate recording of the media content item if the media content item is determined unlikely to be watched in the near future.

As one example of how a media content management system 100 may manage transmission and storage of media content items, when a media device 116 tunes to live media content (e.g., a live television stream), the selected media content may be provided to the media device 116 by an operator headend 104 via a transmission infrastructure 106 (e.g., a QAM infrastructure). If a user of the media device 116 pauses playback of the live media content, in one embodiment, a service provider system 110 may cause a recording of the same media content to start at the operator headend 104 and/or at a cloud storage system 112. When the user resumes playback of the media content item from the same media device 116 or from another media device 116 associated with the user's account, the media content item may be streamed to the media device 116 via an IP-based network from either the operator headend 104 or cloud storage system 112. If the user subsequently catches up to the live point of the media content item, the cloud-based media content management system 100 may continue to stream the media content item to the media device 116 via an IP-based network, or may instead resume transmission of the media content item using the transmission infrastructure 106.

As another example of the media content management system 100 managing transmission and storage of media content items, a service provider system 110 may be configured to store at an operator headend 104 and/or cloud storage system 112 a "live buffer" of media content tuned to by one or more media devices 116. For example, each time a media device 116 tunes to receive a particular media content item, service provider system 110 may start a recording of the media content item at operator headend 104 and/or cloud storage system 112, where the recording is managed as a rolling buffer of a configurable duration of time (e.g., 30 minutes). The rolling buffer for a particular media content item may be automatically deleted after a media device tunes to different media content (e.g., in response to a channel change, selection of different content from an electronic program guide (EPG), etc.), or the buffer may be maintained in storage for a configurable period of time (e.g., 30 minutes). If a user subsequently selects a particular media content item to record, the rolling buffer can be used as part of the recording stored for the user, among other uses.

Although FIG. 2 includes an operator headend 104 that receives media content from content sources 102, distributes the media content to media devices 116, and that also may be a source of media content items stored in a cloud storage system 112, other implementations may not directly involve an operator headend 104. In one embodiment, media devices 116 may receive media content items from content sources 102 (e.g., via an operator headend 104 or directly from a content source 102 via an IP network) and the media content items may be uploaded from the media devices 116 to cloud storage. For example, the content sources 102 may include providers of over-the-top content (OTT), video on demand (VOD), and other content that is transmitted to media devices 116 over the Internet and without the involvement of a cable or satellite television system operator. In this and other examples described herein, a service provider system 110 may not directly interface with an operator headend 104 to enable storage and access to media content items in cloud storage.

System 100 illustrates only one of many possible arrangements of components configured to provide the functionality described herein. Other arrangements may include fewer, additional, or different components, and the division of work between the components may vary depending on the arrangement. Each component of system 100 may feature an open port, API, or other suitable communication interface by which the component may become communicatively coupled to other components of system 100 as needed to accomplish any of the functions of system 100 described herein.

2.2. Example Media Device

FIG. 2 illustrates an example block diagram of a media device in accordance with one or more embodiments. As shown in FIG. 2, a media device 116 may include multiple components such as a memory system 202, one or more storage devices 204, a central processing unit (CPU) 206, a display sub-system 208, an audio/video input 210, one or more input devices/tuners 212, a network module 214, an uploader module 216, and/or other components used to perform the functionality described herein. In an embodiment, a media device 116 may be a DVR. A multifunction media device is described U.S. patent application Ser. No. 12/631,740, entitled "Multifunction Multimedia Device," which is owned by the Applicant and is hereby fully incorporated by reference.

In an embodiment, storage devices 204 generally represent secondary storage accessible by the media device 116. A storage device 204 may include, but is not limited to, any combination of, one or more of: Solid State Drives (SSD), hybrid hard drives, hard drives, etc. Each media device 116 may or may not include one or more storage devices 204. If a media device 116 includes a storage device 204, the storage may be used for various purposes including storing all or portions of recorded media content items, providing a buffer for media device tuners 212, pre-caching portions of media content items stored by a cloud storage system, etc.

In an embodiment, audio/video input 210 generally corresponds to any component that includes functionality to receive audio and/or video input (e.g., HDMI, DVI, Analog, etc.) from an external source. For example, the audio/video input 210 may be a DisplayPort or a high definition multimedia interface (HDMI) that can receive input from different devices. The audio/video input 210 may receive input from a set-top box, DVR, a Blu-ray disc player, a personal computer, a video game console, an audio/video receiver, a compact disk player, an enhanced versatile disc player, a high definition optical disc, a holographic versatile disc, a laser disc, mini disc, a disc film, a RAM disc, a vinyl disc, a floppy disk, a hard drive disk, etc. A media device 116 may include any number of audio/video inputs 210.

In an embodiment, input device/tuners 212 generally represents any input components that can receive a content stream (e.g., through cable, satellite, internet, network, terrestrial antenna, etc.). In a tuner configuration, input device/tuner 212 may allow one or more received frequencies to pass through while filtering out others (e.g., by using electronic resonance, etc.). A television tuner, for example, may convert an RF television transmission into digital audio and video signals which can be further processed to produce sound and/or an image or accept digital signals such as MPEG2, MPEG4, etc. In an embodiment, each media device 116 may have one or more tuners (e.g., quadrature amplitude modulation (QAM) tuners, Digital Video Broadcasting-Cable (DVB-C) tuners, Advanced Television Systems Committee (ATSC) tuners, etc.) for receiving live or on-demand television content from content sources 102. A tuner can be a physical tuner or a virtual tuner that represents an abstract perception of physical components used to receive broadcast content.

In an embodiment, a network module 214 generally represents any input component that can send and receive data over a network (e.g., internet, intranet, world wide web, etc.). Examples of a network module 214 include, but are not limited to, any of: a network card, network adapter, network interface controller (NIC), network interface card, wireless card, Local Area Network adapter, Ethernet network card, any other component that can send and receive information over a network, such as one or more networks 114. The network module 214 may also be used to directly connect with another device (e.g., a media device, a computer, a secondary storage device, etc.).

In an embodiment, input may be received by a media device 116 from any communicatively coupled device through wired and/or wireless communication segments. Input received by the media device 116 may be stored to the memory system 202 or storage device 204. The memory system 202 may include one or more different types of physical memory to store data. For example, one or more memory buffers (e.g., an HD frame buffer) in the memory system 202 may include storage capacity to load one or more uncompressed high definition (HD) video frames for editing and/or fingerprinting. The memory system 202 may also store frames in a compressed form (e.g., MPEG2, MPEG4, or any other suitable format), where the frames are then uncompressed into the frame buffer for modification, fingerprinting, replacement, and/or display. The memory system 202 may include FLASH memory, DRAM memory, EEPROM, traditional rotating disk drives, etc.

In an embodiment, central processing unit 206 may include functionality to perform the functions described herein using any input received by the media device 116. For example, the central processing unit 206 may be used to dynamically derive fingerprints from media content frames stored in the memory system 202. The central processing unit 206 may be configured to mark or identify media content or portions of media content based on tags, hash values, fingerprints, time stamp, or other suitable information associated with the media content. The central processing unit 206 may be used to modify media content (e.g., scale a video frame, etc.), analyze media content, decompress media content, compress media content, etc. A video frame (e.g., an HD video frame, 4K frame, etc.) stored in a frame buffer may be modified dynamically by the central processing unit 206 to overlay additional content (e.g., information about the frame, program info, a chat message, system message, web content, pictures, an electronic programming guide, video content, textual content, or any other suitable content) on top of the video frame, manipulate the video frame (e.g., stretching, rotation, shrinking, etc.), or replace the video frame in real time. Accordingly, an electronic programming guide, advertisement information that is dynamically selected, media content information, or any other text/graphics may be written onto a video frame stored in a frame buffer to superimpose the additional content on top of the stored video frame. The central processing unit 206 may be used for processing communication with any of the input and/or output devices associated with the media device 116. For example, a video frame that is dynamically modified in real time may subsequently be transmitted for display. The central processing unit 206 may be used to communicate with other media devices to perform functions related to synchronization, publication of data, etc.

In an embodiment, the display sub-system 208 generally represents any software and/or device that includes functionality to output (e.g., Video Out to Display 218) and/or actually display one or more images. Examples of display devices include a kiosk, a hand held device, a computer screen, a monitor, a television, projector, etc. The display devices may use different types of screens or display technology such as a liquid crystal display, cathode ray tube, a projector, a plasma screen, etc. The output from the media device 116 may be specially for formatted for the type of display device being used, the size of the display device, resolution (e.g., 720i, 720p, 1080i, 1080p, or other suitable resolution), etc. However, some media devices 116 may not have any display output components (e.g., a media device primarily configured to stream media content items to other media devices).

3.0. FUNCTIONAL OVERVIEW

Approaches, techniques, and mechanisms are disclosed that enable a media device to create media content collections and to generate one or more interfaces displaying information related to created media content collections. For example, a media device (e.g., a media device 116) may generate and cause display of various user interfaces that enable users to create media content collections for media content of interest to the users (e.g., television programs, miniseries, streaming content series, sports teams, etc.), to modify various settings related to the way in which the media device manages media content collections, and to view media content collections in ways that enable users to easily browse and interact with the contents of each collection. In one embodiment, a media device may be configured to create media device collections in part by determining the availability of individual media content episodes for playback, streaming, and/or recording from a variety of broadcast and broadband sources, and presenting those content source options to users, thereby increasing the ease with which users can view episodes of media content of interest.

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising media devices (e.g., DVRs, set-top boxes, personal computers, mobile devices, etc.) which may receive, play, record, and/or store media content items and a service provider system which manages user access to media content items. In other embodiments, the processes are implemented exclusively by one or more servers or by a single client computing device. Examples of such systems are described in the preceding sections.

FIG. 3 depicts an example flow diagram for creating media content collections and causing display of one or more graphical user interfaces displaying media content collection information. Steps shown in FIG. 3 may be rearranged or omitted. Furthermore, additional steps not shown in FIG. 3 may be performed in accordance with one or more embodiments. Accordingly, the selection or arrangement of steps shown in FIG. 3 should not be construed as limiting.

3.1. Creating Media Content Collections

At block 302, a media device receives a request to retrieve information for a media content associated with a plurality of episodes. In one embodiment, the request to retrieve the information for a media content may be associated with a user request to create a media content collection for the media content. Examples of media content for which a user may request a media device to create a media content collection include, but are not limited to, television programs, miniseries, sports teams, sports seasons, podcasts, or any other type of media content accessible to a media device.

In an embodiment, a media device may receive a request to create a media content collection in response to a user providing input directly at the media device (e.g., using a touchscreen) or using a device in communication with the media device (e.g., a remote control or other input device). For example, if the user is browsing an EPG and discovers a particular television program for which the user desires to create a media content collection, the user may provide input selecting the television program and further provide input to create a media content collection for the selected television program. As another example, a user may be watching a sporting event involving a particular sports team and desire to create a media content collection for the particular sports team. In this example, the user may provide input while the user is viewing the sporting event indicating a desire to create a media content collection for the particular sports team.

Figure 5:
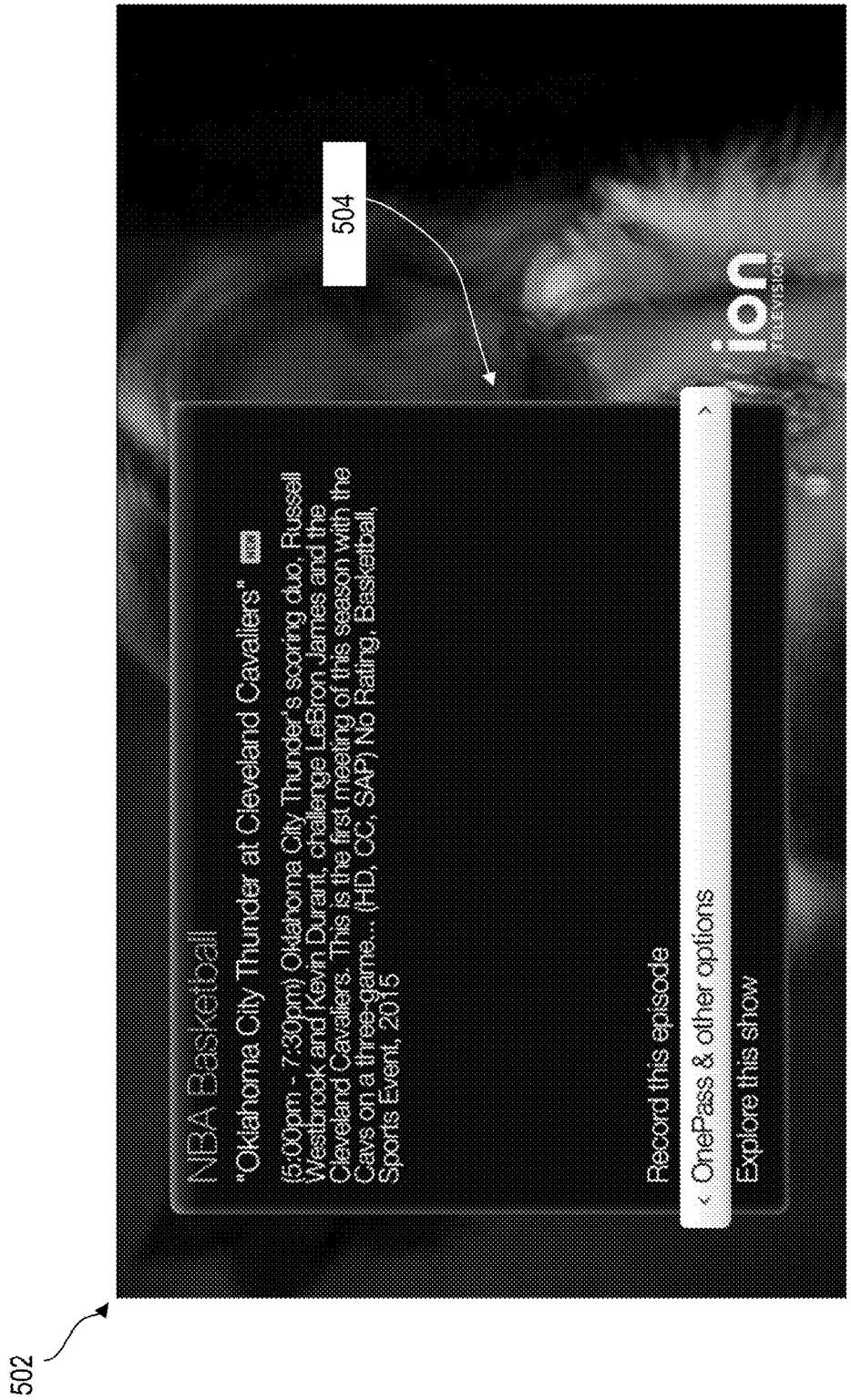
FIG. 5 illustrates an example interface for creating a media content collection from an overlay menu, in accordance with the disclosed embodiments.
Figure 6:
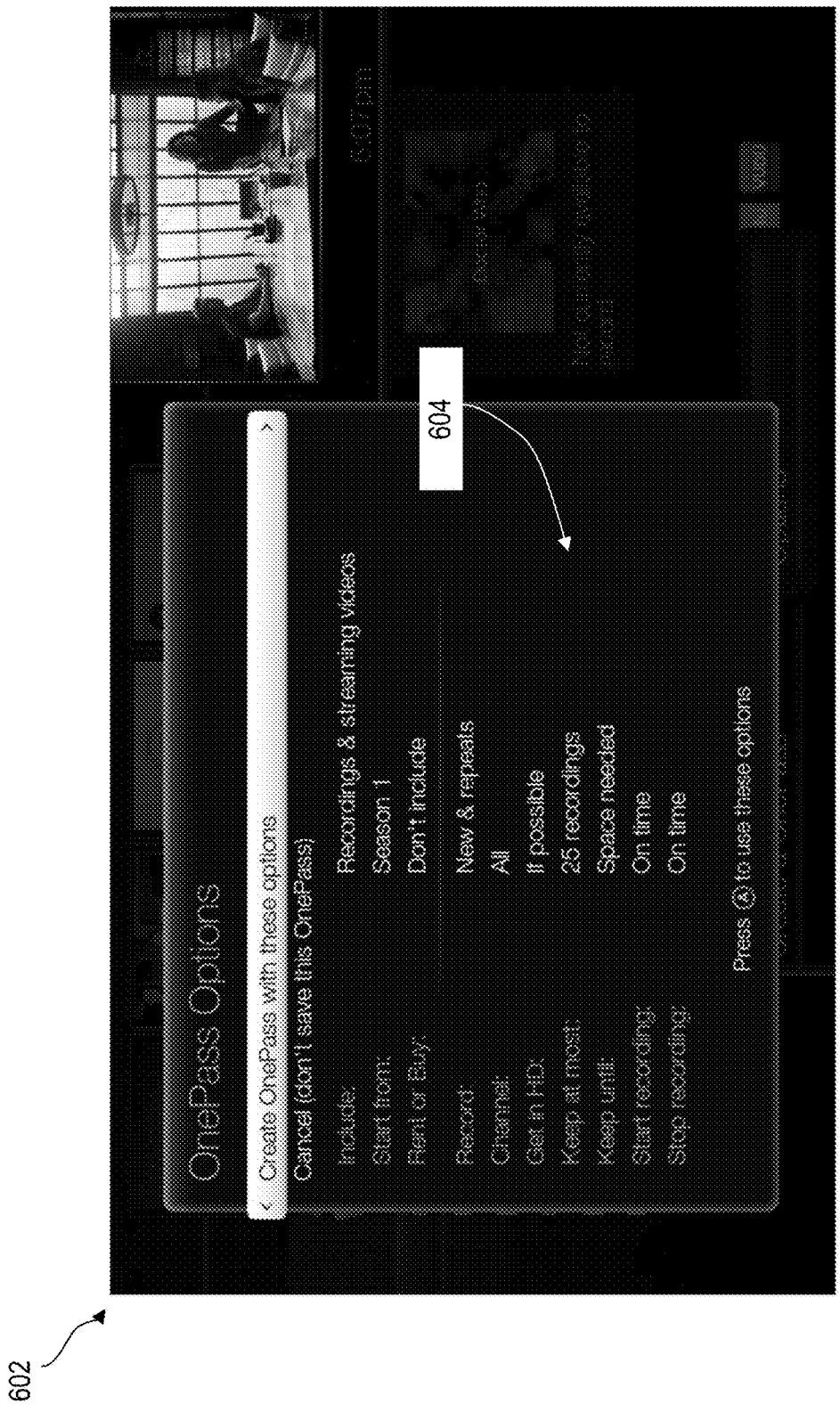
FIG. 6 illustrates an interface that enables a user to configure one or more settings related to a new media content collection, in accordance with the disclosed embodiments.

Each of FIGS. 4-6 illustrate various graphical user interfaces that enable media device users to create media content collections. In some of the example interfaces, a media content collection may also be referred to as a "OnePass".

FIG. 4 illustrates an example interface 402 that enables a user to create a media content collection after selection of a particular a media content from an EPG, search results listing, or any other interface. In FIG. 4, for example, an interface 402 displays various menu options 404, a media content collection creation button 406, along with other information related to the television program "Doctor Who".

In an embodiment, menu options 404 include various actions related to the selected media content, including displaying information about upcoming episodes of the media content, information about all episodes, cast information, bonus features, etc. The interface 402 further includes a media content collection creation button 406, which may be any selectable interface element to indicate a desire to create a new media content collection for the currently displayed media content. In an embodiment, a user may provide further input to indicate whether to create the media content collection with a set of default configuration settings (e.g., by clicking on the "Create a OnePass" button 406), or a user may provide other input to create the media content collection with a set of customizable settings (e.g., by clicking on the "Options" button adjacent to the creation button 406). Examples of settings that a user can customize when creating a media content collections are described hereinafter with respect to FIG. 6.

FIG. 5 illustrates another example interface that enables a user to create a media content collection. In the interface 502 of FIG. 5, for example, an overlay menu 504 is displayed for a particular media content (in this example, representing a basketball game between the Oklahoma City Thunder and Cleveland Cavaliers). The overlay menu 504 may be displayed, for example, in response to a user requesting information for a currently playing media content, selecting a media content episode from an EPG or search results, etc. The overlay menu 504 includes various menu options, including an option to record the selected media content episode, an option to create a media content collection for the associated media content, and an option to present additional information about the media content. Similar to FIG. 4, a user may select the option to create a media content collection and provide further input to either create the collection with a set of default settings or to create the collection with one or more customized settings.

Referring again to FIG. 3, at block 304, a media device optionally receives input specifying one or more settings for the media content collection. As indicated above, during creation of a media content collection, a user may configure one or more settings to determine how the media device manages the collection for the selected media content. A user may specify different settings for each separate media content collection created by the user, where the different settings may depend on various user preferences for each different media content. For example, if a particular television program is of high interest to a user, the user may configure a media content collection for the television program with settings to keep a stored recording of all episodes, while the same user may configure another media content collection to keep only the three most recent recordings for a different television program of lesser interest to the user.

FIG. 6 illustrates an interface 602 that enables a user to configure one or more settings for a new media content collection. The interface 602 includes media content collection settings 604, which may be displayed, for example, in response to a user selecting the "Options" buttons depicted in FIG. 4, in response to selecting a similar interface element of the overlay menu 504 in FIG. 5, or from any other interface.

In one embodiment, settings for a media content collection may include an option to indicate whether to include in the collection only recordable episodes (e.g., episodes available from one or more content sources that allow the media device to create recorded copies of the episodes), only streaming episodes (e.g., episodes available from one or more third party streaming providers, VOD libraries, or other broadband sources), or to include both recordable and streaming episodes. For example, a user may desire to include only recordable episodes for a particular media content collection if the user desires to not view streaming episodes of the media content. As another example, a user may desire to include only streaming episodes in order to reduce an amount of storage space at the media device used by the particular collection. As yet another example, a user may desire to include both recordable and streaming episodes of a media content in order to include as many episodes as possible in the collection.

In an embodiment, settings for a media content collection may include an option for specifying a particular starting season from which to collect episodes for a media content. For example, if a particular television program currently includes six seasons of episodes and a user has previously viewed the first two seasons, the user may configure the media content collection to include only episodes from the third and subsequent seasons. As another example, if the user has not yet viewed episodes from any of the seasons, the user may configure the media content collection to include episodes from all available seasons.

In an embodiment, settings for a media content collection may include an option to include transactional episodes of the media content, where transactional episodes include episodes available for purchase or rent from one or more content sources. For example, a user may specify an option to include transactional episodes for a particular media content collection corresponding to a particular television program, where some of the episodes of the television program are available only for purchase or rent from one or more content sources. In this example, the media content collection may display the transactional episodes alongside other episodes the television program, and the user may be prompted to purchase or rent the episodes upon selection of a transactional episode. The user may be prompted to purchase or rent selected transactional episodes directly in a media content collection interface, or the user may be directed to purchase or rent the episodes in a separate interface provided by a content source of the transactional episodes.

In an embodiment, settings for a media content collection may include an option of whether to record only new episodes, or to record both new episodes and repeat episodes. In an embodiment, settings for a media content collection may include an option of one or more particular broadcast channels from which to record episodes. For example, multiple broadcast channels may broadcast a particular television program and a user may select one or more of the channels from which the user prefers to record and view the episodes. In an embodiment, if any broadband sources allow the media device to record media content, a user may further select one or more broadband content sources to include.

In an embodiment, settings for a media content collection may include an option to record shows based on various available resolutions (e.g., only in high-definition (HD), only in standard-definition (SD), in HD when available and SD otherwise, etc.). In an embodiment, settings for a media content collection may further include other various recording options, including an option to specify a total number of recordings to store for the media content, an option to specify how long to store recordings (e.g., one week, one month, until storage space is needed, etc.), and/or options for when to start and when to end recordings of episodes relative to times specified in an EPG or other source. For example, a user may configure the recording settings depending on an amount of storage space available to the user and depending on how much of the storage space the user desires the particular media content to use.

3.2. Displaying Media Content Collections

In an embodiment, in response to receiving input to create a media content collection, a media device may cause data representing the media content collection to be stored at the user's media device, at a service provider system 110, or at any other storage location. In general, data representing the media content collection may include information identifying the media content to which the collection relates, information indicating one or more settings associated with the collection, information identifying the user that created the collection and/or a media device at which the collection was created, etc. In an embodiment, based on the data representing created media content collections, a media device may be configured to generate and cause display one or more graphical user interfaces that enable users to view and interact with created media content collections.

Referring again to FIG. 3, at block 306, the media device determines, for each episode of one or more episodes of the media content, whether the episode is available from one or more content sources of a set of content sources, the set of content sources including both broadcast sources and broadband sources. For example, if the media content is a television program that includes a number of individual episodes, the media device may determine one or more content sources from which one or more of the episodes is available. In an embodiment, a media device may determine content sources from which episodes are available during the initial creation of the media content collection, in response to receiving a user request to view information about a media content collection, in response to receiving a user request to view information about one or more particular episodes, on a periodic basis, or at any other time.

In one embodiment, a media device may request information about content sources from which episodes of a media content are available from a service provider system 110, directly from one or more content sources 102, or from any other source. A service provider system 110 may, for example, maintain a database of media content items and from which content source(s) each episode of various media content is available. For example, the service provider system 110 may retrieve and collect the information from a third-party service that maintains content listings and other data for media content. In another example, the service provider system 110 may collect information for some or all media content by directly querying one or more content sources for information about various media content. In yet another example, a media device 116 may determine the availability of one or more episodes from one or more content sources by querying the content sources and without requesting the information from a service provider system 110.

At block 308, the media device causes display of a graphical user interface that, for at least one episode of the plurality of episodes, indicates from which of one or more content sources the at least one episode is available. For example, as described above in reference to block 306, a media device may be configured to retrieve information related to the availability of episodes of a media content from various content sources, and the retrieved information may subsequently be displayed in response to a user requesting display of the media content collection, along with other information.

In an embodiment, a user may request to view a media content collection from any of a number of different interfaces including an interface displaying a list of created media content collections, from an EPG, a search results listing, etc. A media device may be configured to display one or more different views for a media content collection depending on how the user desires to view the contents of a particular collection. For example, a media device may be configured to display one or more of a "recordings" view (displaying recorded episodes of a media content collection), a "my episodes" view (displaying a personalized view of episodes of a media content collection), an "all episodes" view (displaying all available episodes of a media content collection), among other possible views.

Figure 7:
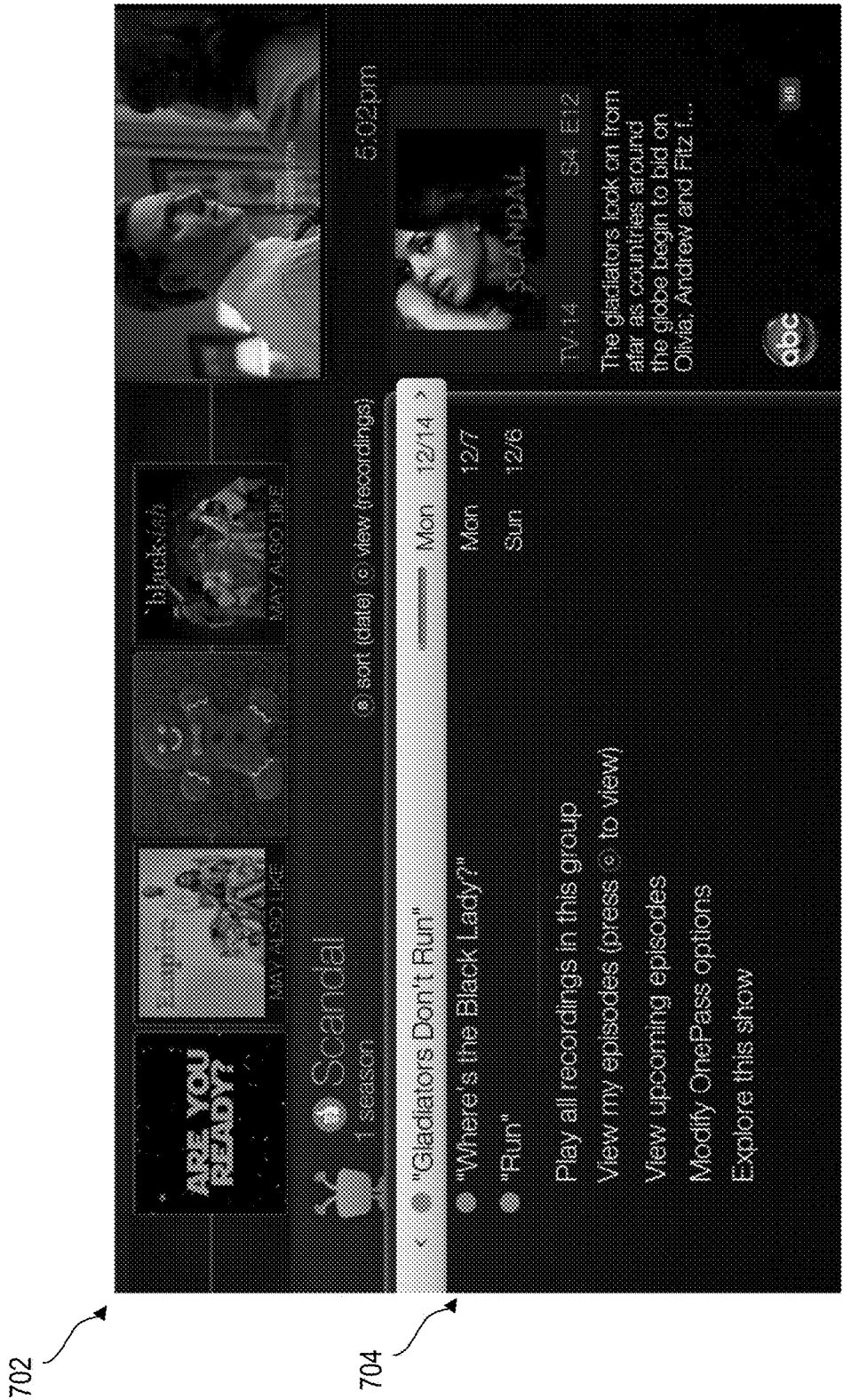
FIG. 7 illustrates an interface for viewing recordings associated with a media content collection, in accordance with the disclosed embodiments.

FIG. 7 illustrates an interface for viewing recorded episodes associated with a media content collection. For example, a recordings view may display episodes of a particular media content that the media device has recorded at the media device (or caused to be recorded in a cloud-based recording system or other storage location) based on recording settings associated with the collection. The interface 702 of FIG. 7 includes a recorded episodes list 704, which in this example displays a list of recorded episodes for the television program "Scandal". Each of the recorded episodes in the list may further display information indicating a title of the episode, whether the episode previously has been played, how much of the episode has been played, a date when the episode originally aired, a date when the episode was recorded, etc. In an embodiment, a user may select one or more episodes from the record episodes list 804 for playback, deletion, or to display additional information related to the selected episodes.

Figure 8:
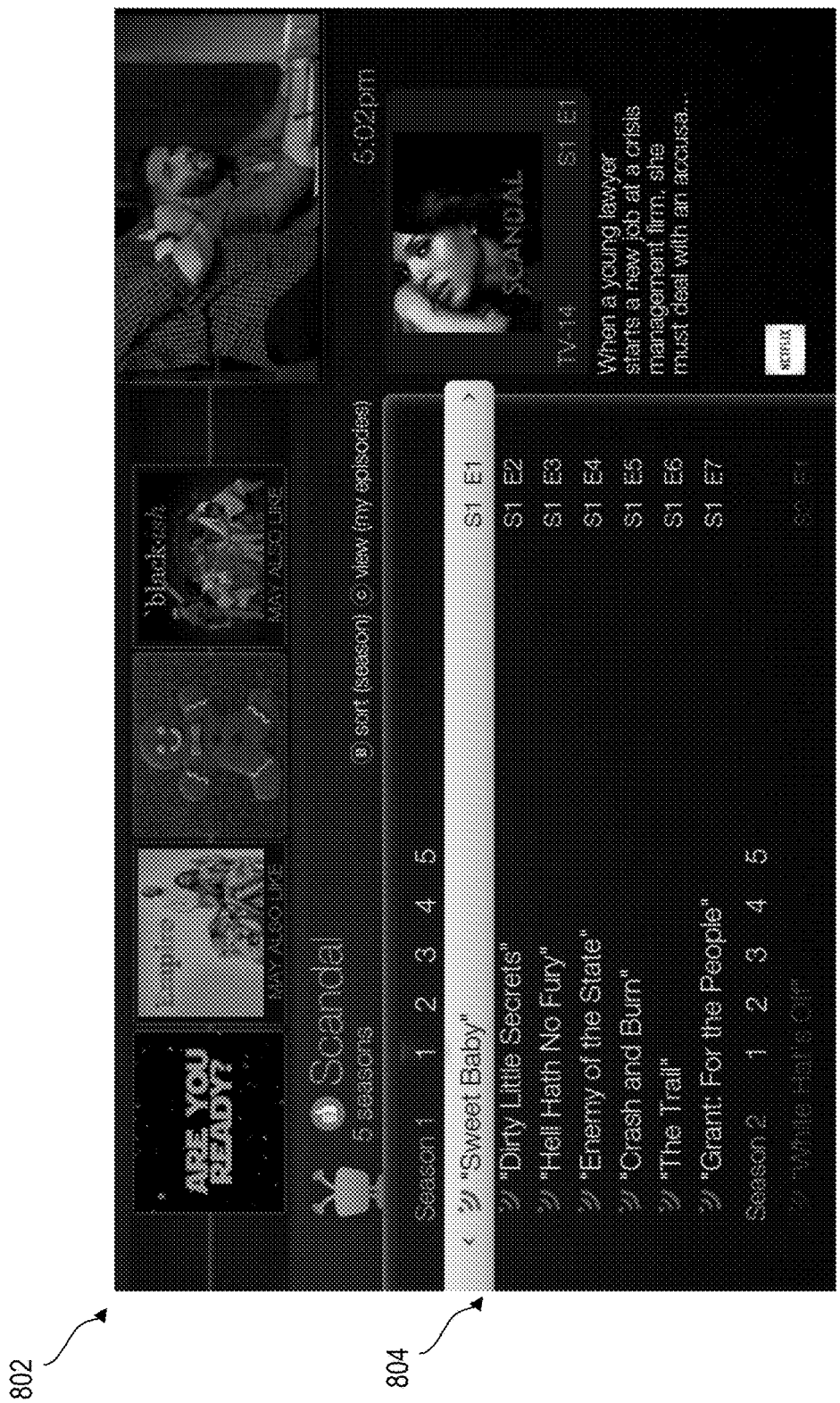
FIG. 8 illustrates an interface for viewing a personalized list of episodes of a media content collection, in accordance with the disclosed embodiments.

In one embodiment, a media device may include a personalized view, or "my episodes" view, of a media content collection, which includes both recordings of episodes and other episodes available for streaming from one or more user-configured broadband content sources. FIG. 8 illustrates an interface for viewing a personalized media content collection display. The interface 802 of FIG. 8 includes a personalized episodes list 804, which in this example corresponds to a list of episodes for the television program "Scandal". In an embodiment, personalized episodes list 804 may display various information related to each episode, including whether the episode is recorded (e.g., by displaying a circle next to the episode) and/or available for streaming from one or more user-configured broadband content sources (e.g., by displaying a signal icon), a title of the episode, a season number and episode number, etc.

Figure 9:
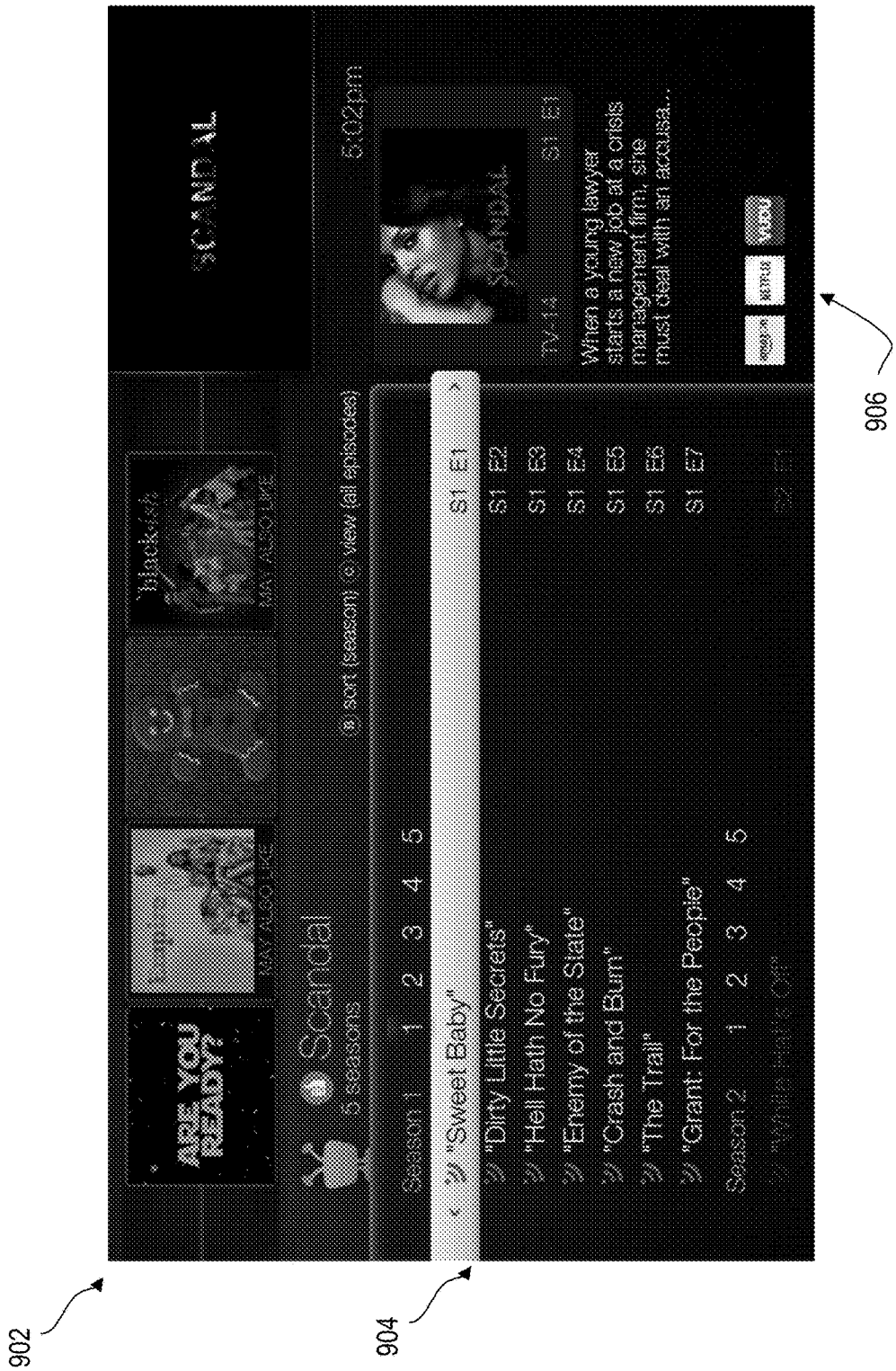
FIG. 9 illustrates an interface for viewing all episodes of a media content collection, in accordance with the disclosed embodiments.

In one embodiment, a media device may include an "all episodes" view, which displays all available episodes of a media content, including episodes which may be available from broadband content sources not yet configured by a user, episodes to be broadcast in the future, and episodes not yet available from any broadcast or broadband sources but which may become available at a future time. FIG. 9 illustrates an example interface 902 for viewing an "all episodes" display of a media content collection. The interface 902 of FIG. 9 includes all episodes list 904 which, similar to personalized episodes list 804 of FIG. 8, may display various information related to each episode including whether the episode is recorded, available for streaming, or not currently available from any content source, a title for the episode, etc.

In one embodiment, a media content collection interface may include a content sources list 906, where the content sources list displays a separate icon or other identifier for each content source from which the currently selected episode in episodes list 904 is available. In FIG. 9, for example, the episode of the television program "Scandal" entitled "Sweet Baby" is currently selected in episodes list 904, and the content sources list 906 indicates that the selected episode is currently available from the Amazon, Netflix, and Vudu broadband streaming content sources. If the selected episode was also available from any broadcast content sources (e.g., ABC, CBS, NBC, etc.), a separate icon may also be displayed for each broadcast content source. A different content sources list 906 may be displayed for each episode when an episode is selected from episodes list 904 depending on the content source(s) from which each episode is available. In one embodiment, content sources list 906 may display only content sources configured by and available to the current user, or a content sources list 906 may display all known content sources from which the selected episode is available. In one embodiment, content sources list 906 may display content source identifiers differently depending on whether the content source is currently available to the user (e.g., by displaying normal icons for available content sources and grayed out icons for currently unavailable content sources). In an embodiment, icons or other identifiers displayed in content sources list 906 may be sorted based on popularity of the content sources, based on frequency of use of each content source by the current user, based on whether the episodes are available as transactional episodes or not from each content source, based on information about the quality of video available from each content source, or based on any other factors.

In an embodiment, as depicted in each of the example interfaces described above in reference to FIGS. 7-9 and in other displays, a media device may be configured to display episodes of a media content collection according to seasons. For example, referring again to FIG. 9, a user may select a particular season number from the seasons labeled 1-5 above all episodes list 904 to view episodes associated with a particular season. By displaying episodes grouped into seasons, users may more easily navigate media content collections, particularly for media content associated with a large number of episodes.

In one embodiment, a media content collection interface may be configured to display one or more notifications when a new episode and/or new season of episodes becomes available from one or more content sources. For example, when a media content collection initially is created for a particular television program, one or more episodes of the television program may not be available from any broadcast or broadband content sources, or may not be available from any content sources to which the current user has access (e.g., because the user is not a subscriber to one or more content sources). However, at a later time, one or more third party streaming content providers or other content sources may make the previously unavailable episodes available for streaming. In one embodiment, in response to the media device detecting that the previously unavailable episodes of a media content are now available, or are soon to be available, the media device may display one or more alerts to the user. For example, an alert may include a pop-up message, an icon or message displayed in a media content collection display screen, an email or text alert sent to the user, or any other form of notification. The user may then select the alert or otherwise navigate to a media content collection screen to view the newly available episodes. In an embodiment, a media content collection may be configured to display a similar alert if one or more previously available episodes and/or seasons of a media content become unavailable from one or more content sources or are soon to become available.

In an embodiment, a user may select one or more episodes of a media content collection for playback (e.g., by selecting the episode(s) from one of the episode lists illustrated above or from any other interface). If a user selects a recorded episode from a recorded episodes list, for example, the user may provide further input to cause playback of the episode, to view additional information about the episode, to delete the recorded episode, or to perform other actions. If a user selects an episode that is available for streaming from one or more broadband content sources, the content may be displayed in the same interface during playback, or the user may be directed to another application for playing content from the broadband content source. In an embodiment, some episodes may be available from two or more different broadband content sources, and a user may be prompted to choose a particular content source from which to stream the selected episode(s). In one embodiment, a user may select a group of episodes, an entire season, or an entire media content collection for playback, and each of the selected episodes may be caused for playback in succession.

3.3. Configuring Media Content Collections

Figure 10:
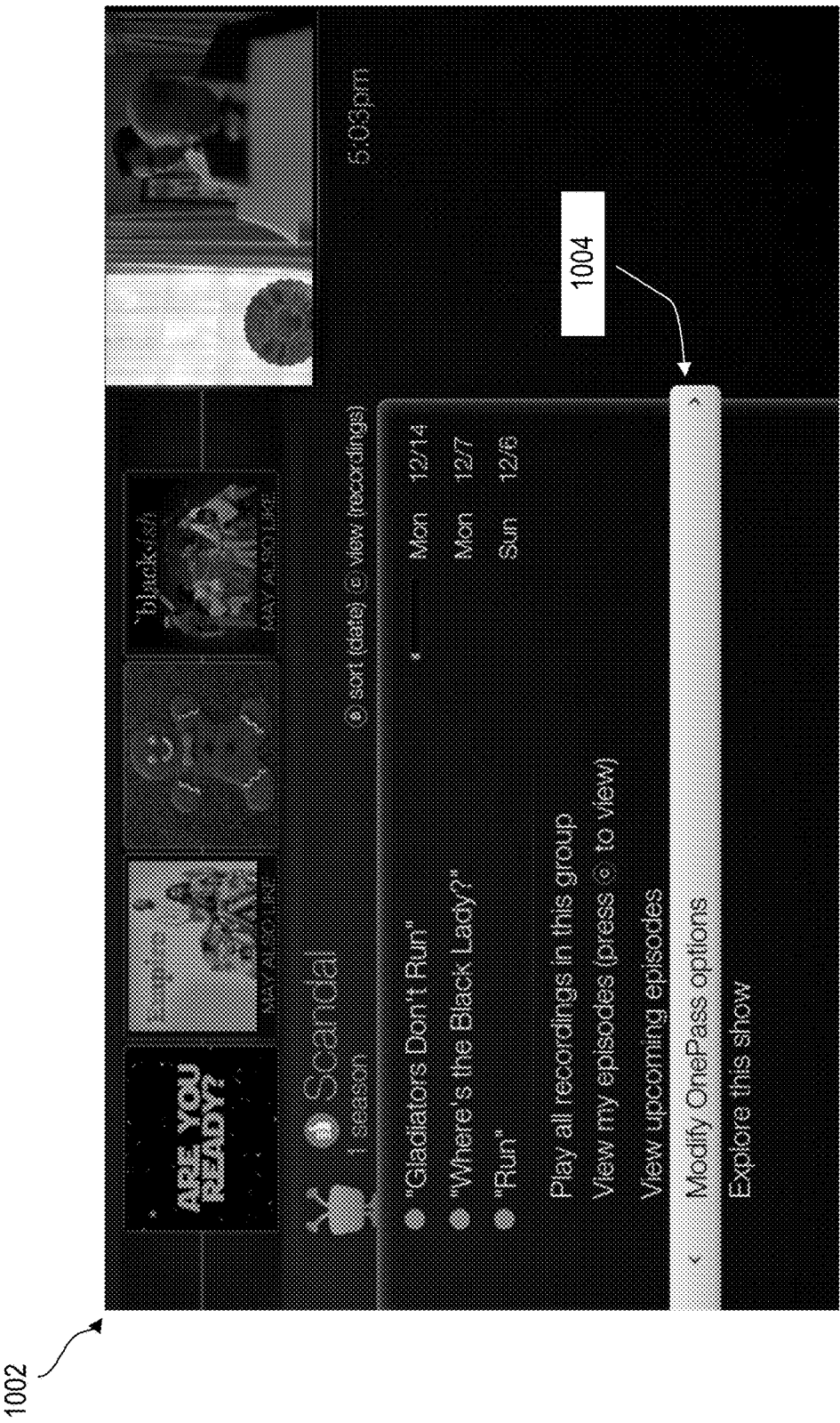
FIG. 10 illustrates an interface including an interface element to modify options of an existing media content collection, in accordance with the disclosed embodiments.
Figure 11:
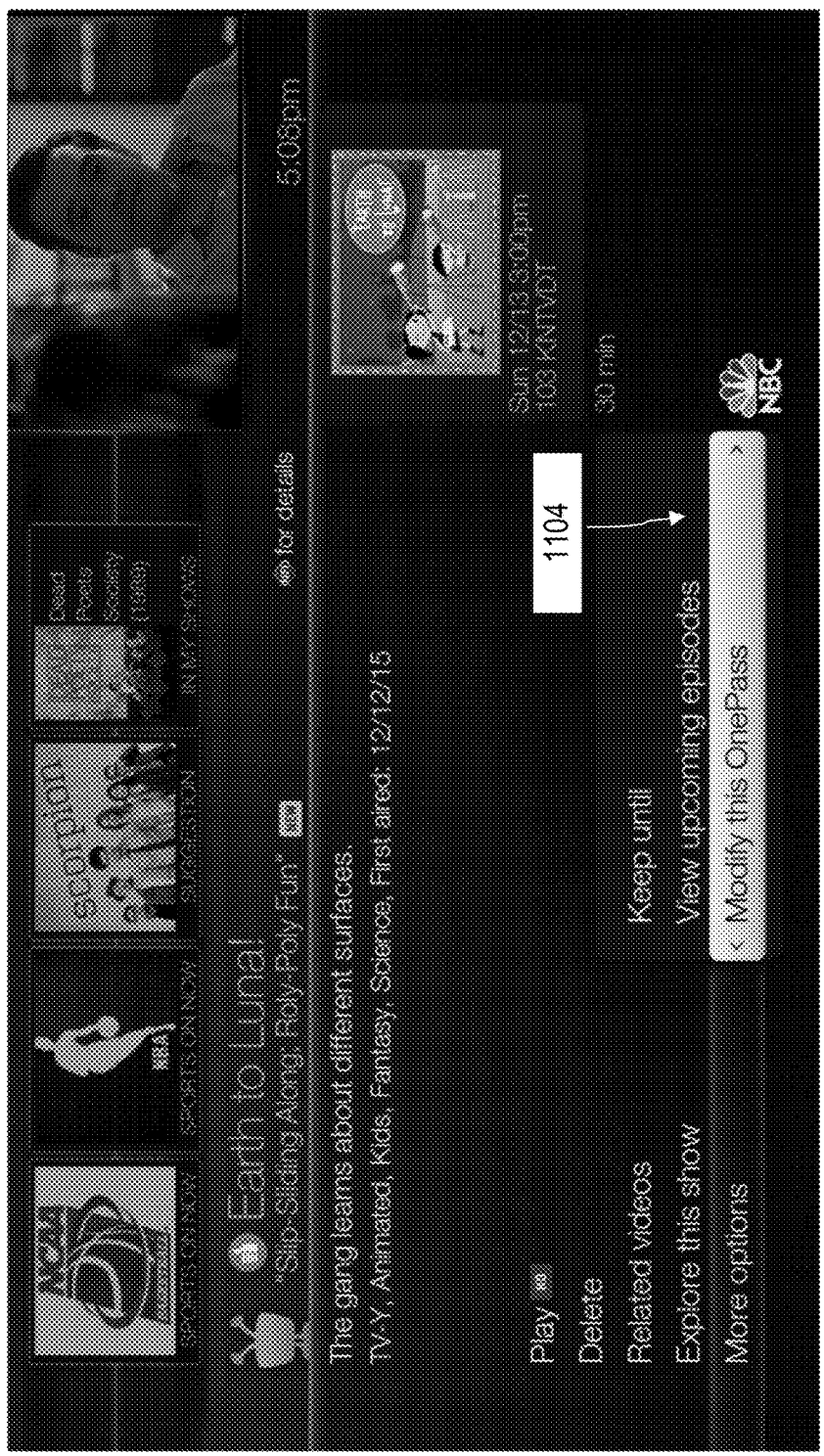
FIG. 11 illustrates an interface displaying information for a particular episode of a media content collection and including an interface element to modify settings of the corresponding media content collection, in accordance with the disclosed embodiments.

In an embodiment, a media device may provide one or more graphical user interfaces for configuring options related to one or more previously created media content collections and/or to configure a set of default configuration options for media content collections to be created in the future. FIGS. 10 and 11 illustrate example interfaces from which a user may navigate to one or more other interfaces to modify settings for an existing media content collection. For example, FIG. 10 illustrates an example interface 1002 displaying a collection of several recorded episodes of the television program "Scandal" and that includes a modify collection settings button 1004. FIG. 11 illustrates a similar interface 1102 displaying information for a single episode of a television program and including a modify collection settings button 1104. A user viewing either interface 1002, 1102, or a similar interface may select a modify collection settings button, for example, if the user desires to modify one or more settings associated with a collection for the currently displayed media content.

Figure 12:
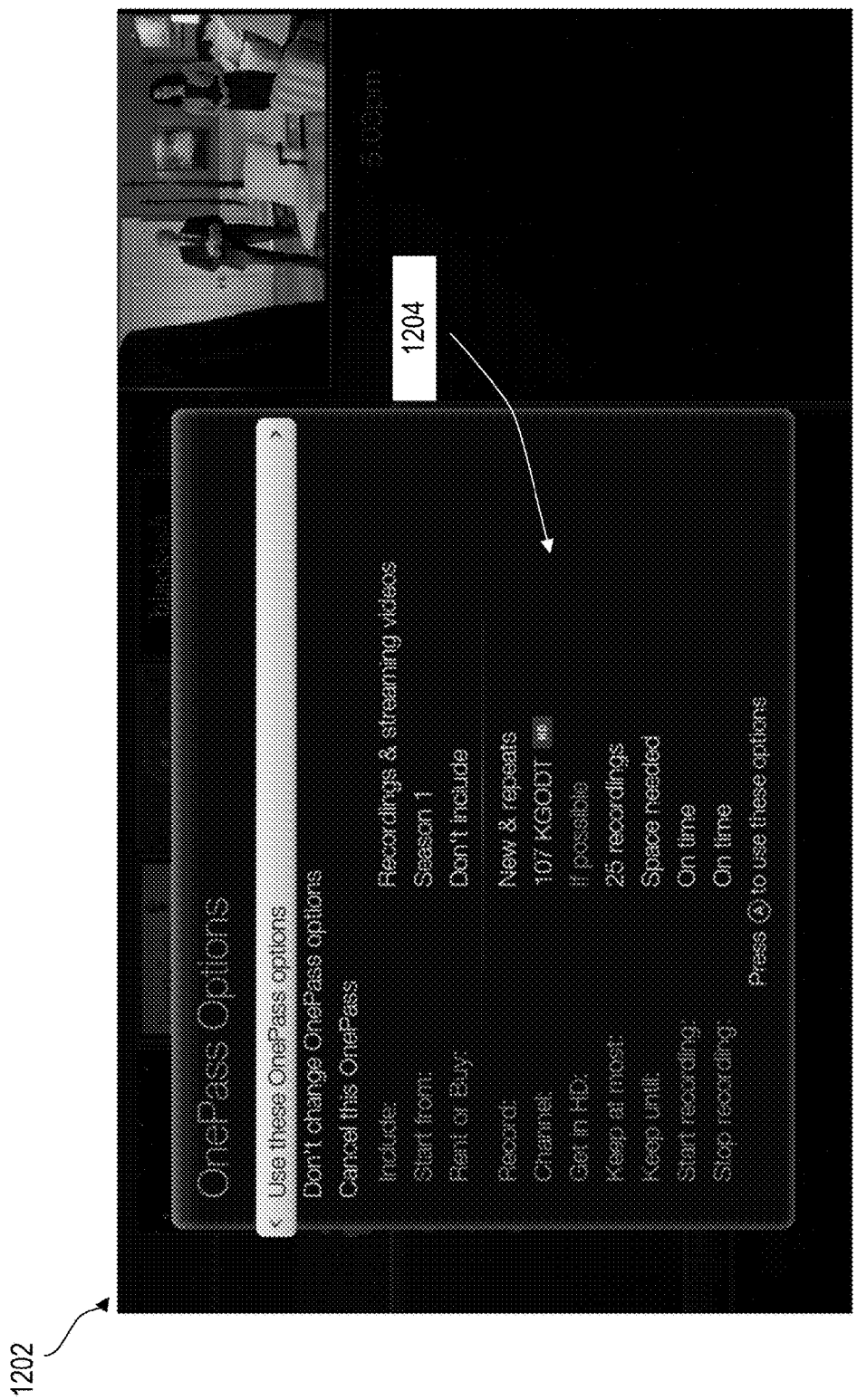
FIG. 12 illustrates an interface for modifying settings related to an existing media content collection, in accordance with the disclosed embodiments.

FIG. 12 illustrates an example interface for configuring options related to an existing media content collection. FIG. 12 includes media content collection settings 1204 with various configurable settings related to a media content collection. Similar to the settings displayed in FIG. 6, media content collection settings 1204 may include options to indicate whether to include recorded episodes, streaming episodes, or both, a particular season from which to start the collection, whether to include transactional episodes, etc. In an embodiment, collection settings 1204 may provide menu options to keep the previously existing collection settings without change, to cancel or delete the media content collection, to pause the media content collection (e.g., to maintain the current state of the media content collection without adding additional episodes), to use the newly configured settings, etc.

A user of a media device may create any number of separate media content collections for media content items of interest to the user. For example, a user may create a separate media content collection for several different television programs, several other media content collections for sports teams of interest to the user, another media content collection for streaming movies the user desires to watch, etc. In an embodiment, to enable users to manage any number of separate media content collections created by the users, a media device may provide one or more interfaces that enable users to manage and/or configure created media content collections in one place. For example, in one embodiment, a media device may provide a media content collection management interface, where the collection management interface displays a list of a user's created media content collections and other related information. A user can use the collection management interface to select one or more media content collections for more information, for playback of episodes within a collection, for deletion of the collection, etc.

Figure 13:
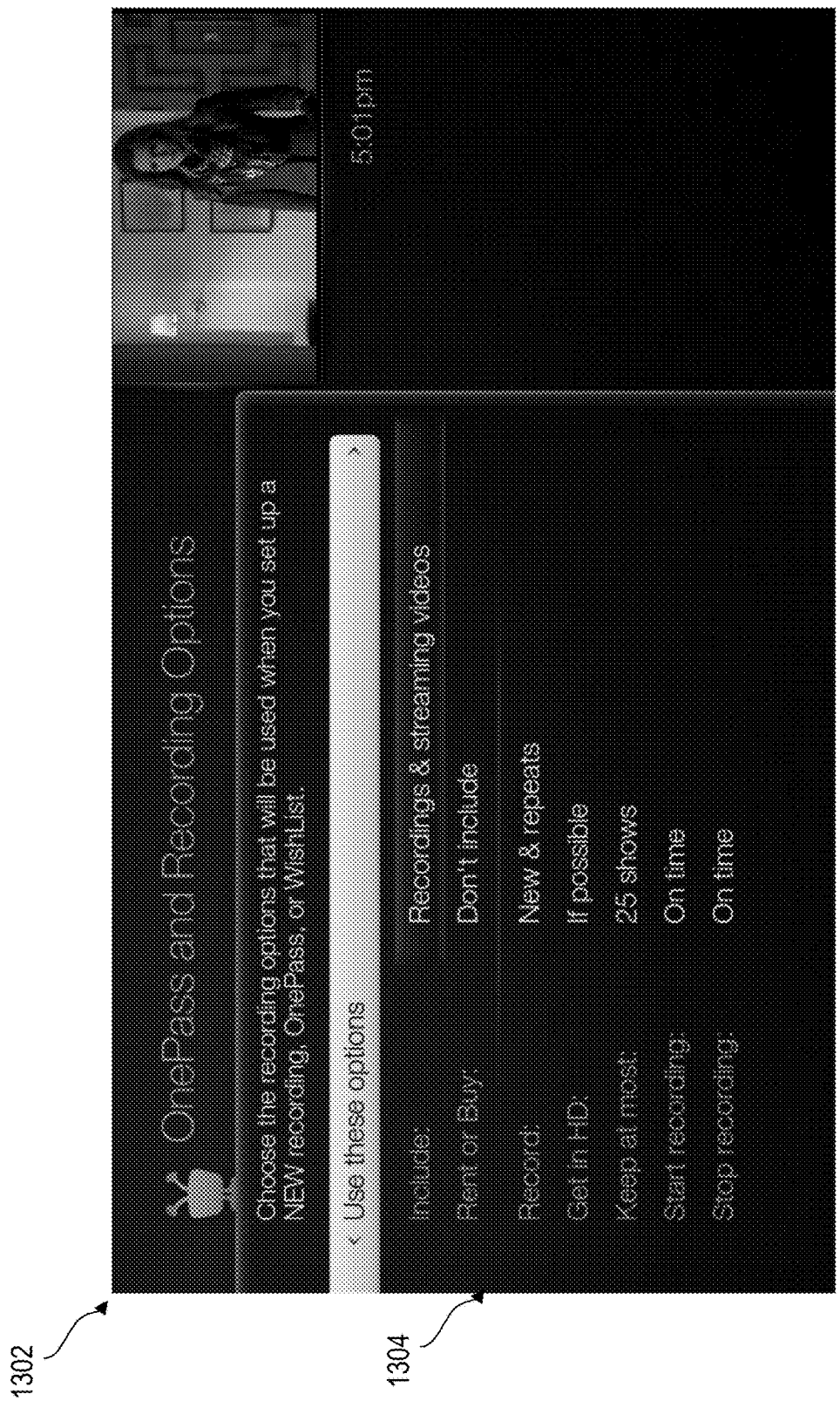
FIG. 13 illustrates an interface for modifying recording settings for a media content collection, in accordance with the disclosed embodiments.

In one embodiment, a media device may provide one or more interfaces that enable a user to configure one or more default settings for media content collections created by the user. FIG. 13 illustrates an example interface 1302 that includes default settings 1304. In one embodiment, default settings 1304 include a number of user configurable options to be applied to newly created media content collections as a set of default settings. Similar to settings 1204 of FIG. 12 and settings 604 of FIG. 6, a user may configure collection settings 1304 to indicate whether media content collections are to include recordable episodes only, streaming episodes only, or include both, whether to include transactional episodes, whether to record only new episodes or new and repeat episodes, etc.

In one embodiment, a media device may enable users to configure a priority for media content collections to resolve recording conflicts that may occur between media content collections. For example, a user may configure several separate media content collections, each with a separate recording schedule for episodes associated with the collection. Depending on a number of tuners available to a media device, the media device may encounter situations in which there are more scheduled recordings than tuners available to record the episodes. To ensure that a user's most preferred media content collections are given recording preference in such situations, a user may create a rank ordered priority list of configured media content collections, where media content collections higher in the priority list are selected for recording over collections lower in the priority list in the event of recording conflicts. In one embodiment, in the instance of a recording conflict, for example, episodes of media content lower in the priority list may not be recorded, the episodes may be scheduled for recording by another media device with available tuners, and/or the episodes may be rescheduled for recording by a cloud-based recording system.

Figure 14:
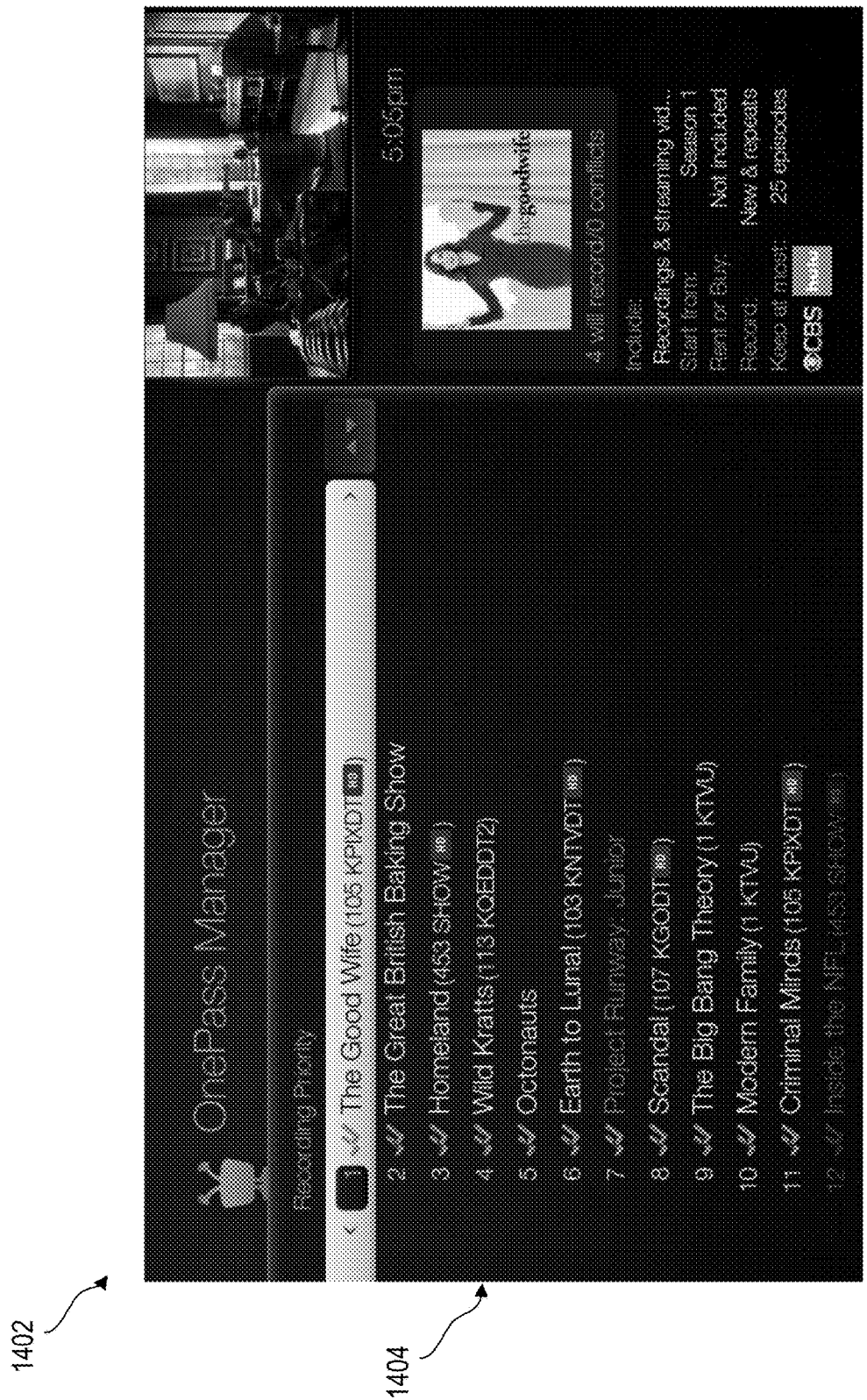
FIG. 14 illustrates an interface for managing recording conflict priorities for a plurality of media content collections, in accordance with the disclosed embodiments.

FIG. 14 illustrates an interface for managing recording priorities for a plurality of media content collections. The interface 1402 of FIG. 14 includes a recording priority list 1404, which includes a list of several media content collections numbered 1-12. For example, the media content collection corresponding to the television program "The Good Wife" is currently at the top of the priority list 1404, followed by "The Great British Baking Show", "Homeland", and so forth. Thus, the current recording priority list 1404 indicates that the collection for the "The Good Wife" has recording priority over the other collections numbered 2-12, and "The Great British Baking Show" has recording priority over collections numbered 3-12, and so forth. In an embodiment, a user may select media content collections from the priority list 1404 and move the collections up or down in the list to change the priority ordering.

In an embodiment, settings for media content collections may include one or more interfaces for configuring broadband content sources from which media content items may be accessed. For example, the broadband content sources may include third party streaming content providers, VOD libraries, or other content sources for which the user has an account (e.g., because the user paid for a subscription to the provider) or which do not require a paid subscription. A user may configure one or more broadband sources by providing account information and any other relevant configuration information. In one embodiment, a user may also select and unselect particular configured broadband content sources which the user desires the media device to collect episodes. For example, if a user has access to a particular broadband source but does not desire media content collection to collect episodes from the particular broadband source, the user may deselect the source in the configuration settings.

In an embodiment, a media device may provide one or more interfaces for collecting streaming movies or other non-episodic media content from one or more broadband content sources. For example, a user may select a movie or other non-episodic content from a list of search results, EPG, or other interface and further provide input to add the non-episodic content to a particular streaming content folder. In an embodiment, a user may be able to view media content saved in a streaming content folder similar to viewing media content collections for other media content.

4.0. EXAMPLE EMBODIMENTS

In an embodiment, a method or non-transitory computer readable medium comprises: receiving, by a media device, a request to retrieve information for a media content associated with a plurality of episodes; determining, for each episode of the plurality of episodes, whether the episode is available from one or more content sources of a set of content sources, the set of content sources including both broadcast content sources and broadband content sources; causing display of a graphical user interface that displays an identifier of two or more episodes of the plurality of episodes and, for at least one episode of the plurality of episodes, an indication of content sources of the set of content sources from which the at least one episode is available for playback by the media device.

In an embodiment, the method or non-transitory computer readable medium further comprises: wherein the graphical user interface further indicates, for at least one episode of the plurality of episodes, that the at least one episode has been recorded and is stored locally by the media device.

In an embodiment, the method or non-transitory computer readable medium further comprises: receiving a selection of a particular episode of the plurality of episodes; causing display of a separate icon representing each content source of the set of content sources from which the particular episode is available for playback by the media device.

In an embodiment, the method or non-transitory computer readable medium further comprises: determining that the at least one episode is available from one or more broadband content sources; subsequent to determining that the at least one episode is available from one or more broadband content sources, determining that the at least one episode is no longer available from at least one broadband content source of the one or more broadband content sources; causing display of an alert indicating that the at least one episode is no longer available from the at least one broadband content source of the one or more broadband content sources.

In an embodiment, the method or non-transitory computer readable medium further comprises: recording, by the media device, at least one episode of the media content for storage by the media device.

In an embodiment, the method or non-transitory computer readable medium further comprises: causing recording of at least one episode of the show for storage by a cloud storage system.

In an embodiment, the method or non-transitory computer readable medium further comprises: causing recording, by the media device, at least one episode of the show for storage by a cloud storage system; wherein the graphical user interface displays an indicating that the at least one episode is stored by the cloud storage system.

In an embodiment, the method or non-transitory computer readable medium further comprises: receiving from the user an indication of a season to begin collection; wherein the graphical user interface displays only episodes from the selected season and subsequent seasons.

In an embodiment, the method or non-transitory computer readable medium further comprises: wherein the one or more broadband content sources comprise broadband content sources configured by a user of the media device.

In an embodiment, the method or non-transitory computer readable medium further comprises: determining the media content collection includes one or more episodes that are not currently available from any of the one or more broadband content sources; monitoring the one or more broadband content sources for the availability of any of the one or more episodes; in response to detecting the availability of any of the one or more episodes, causing display of an alert.

5.0. IMPLEMENTATION MECHANISM—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
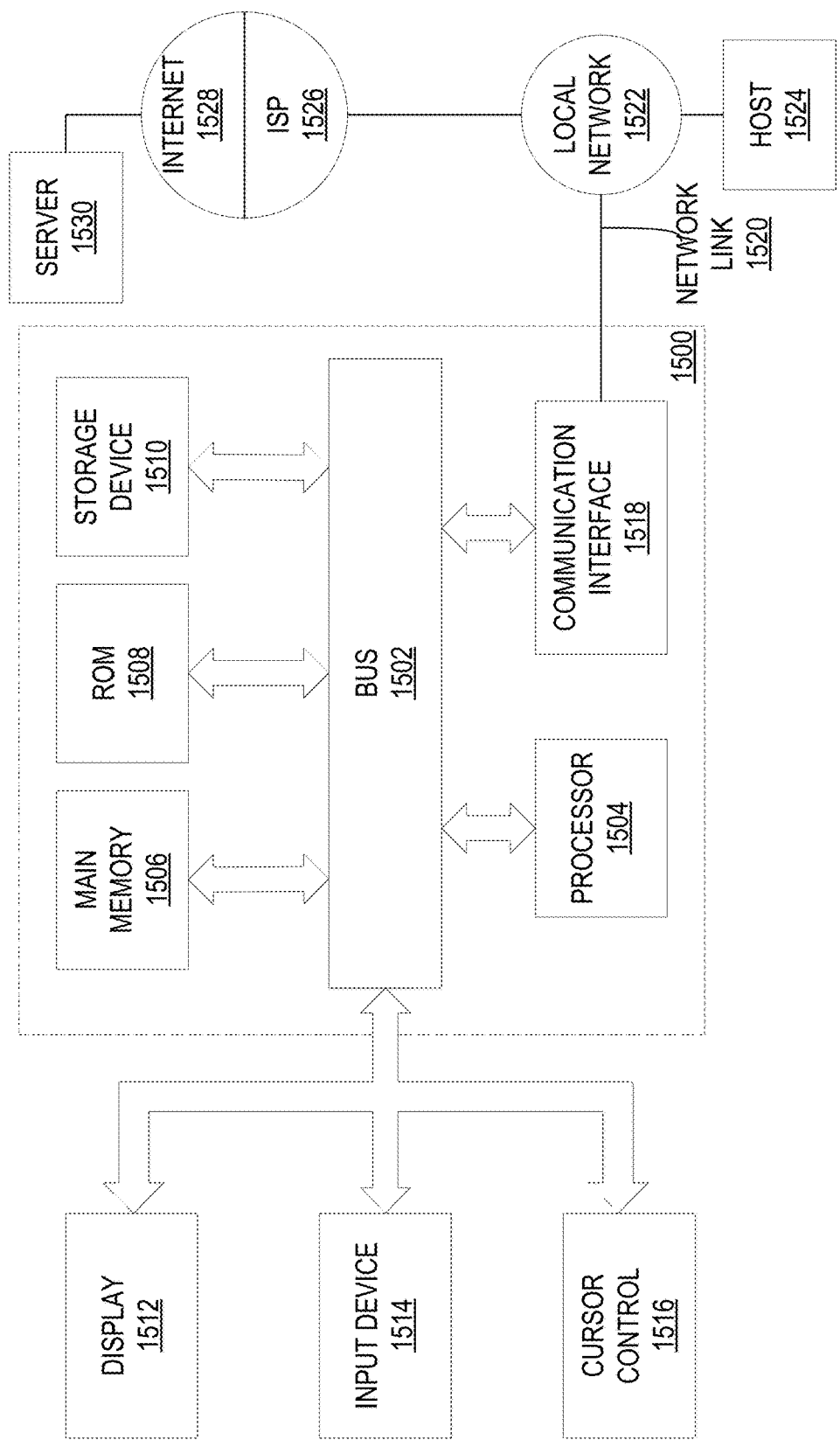
FIG. 15 is block diagram of a computer system upon which embodiments of the invention may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    receiving, by a media device, a request to retrieve information for a plurality of episodes, subject to a requirement relating to a selected season;
    for each episode in the plurality of episodes from the selected season and subsequent seasons:
        determining an availability of the respective episode from one or more particular content sources of a set of content sources, the set of content sources including both broadcast content sources and broadband content sources;
        causing display of a graphical user interface that displays an identifier of the respective episode and an indication of the one or more particular content sources of the set of content sources from which the respective episode is available for playback by the media device; and
        for each content source of the one or more particular content sources:
            determining whether the respective episode is available for playback from the respective content source;
            in response to determining that the respective episode is available for playback from the respective content source, causing display of a content source identifier for the respective content source with a characteristic; and
            in response to determining that the respective episode is not available for playback from the content source, causing display of the content source identifier without the characteristic.

2. The method of claim 1, wherein the graphical user interface further indicates, for the respective episode of the plurality of episodes, that the respective episode has been recorded and is stored locally by the media device.

3. The method of claim 1, further comprising:
    receiving a selection of a particular episode of the plurality of episodes; and
    causing display of a separate icon representing each content source of the set of content sources from which the particular episode is available for playback by the media device.

4. The method of claim 1, further comprising:
    determining that the respective episode is available from one or more broadband content sources;
    in response to determining that the respective episode is available from the one or more broadband content sources, determining that the respective episode is no longer available from at least one broadband content source of the one or more broadband content sources; and
    causing display of an alert indicating that the respective episode is no longer available from the at least one broadband content source of the one or more broadband content sources.

5. The method of claim 1, further comprising recording, by the media device, at least one episode of the plurality of episodes for storage by the media device.

6. The method of claim 1, further comprising causing recording of the respective episode of the show for storage by a cloud storage system.

7. The method of claim 1, further comprising:
    causing recording, by the media device, the respective episode of the show for storage by a cloud storage system;
    wherein the graphical user interface displays an indicating that the respective episode is stored by the cloud storage system.

8. The method of claim 1, wherein the one or more broadband content sources comprise broadband content sources configured by a user of the media device.

9. The method of claim 1, further comprising:
    determining a media content collection includes one or more episodes that are not currently available from any of the one or more broadband content sources;
    monitoring the one or more broadband content sources for the availability of any of the one or more episodes; and
    in response to detecting the availability of any of the one or more episodes, causing display of an alert.

10. One or more non-transitory computer-readable storage media, storing instructions, which when executed by one or more processors causes:
    receiving, by a media device, a request to retrieve information for a plurality of episodes, subject to a requirement relating to a selected season;

for each episode in the plurality of episodes from the selected season and subsequent seasons:
  determining an availability of the respective episode having the respective type from one or more particular content sources of a set of content sources, the set of content sources including both broadcast content sources and broadband content sources;
  causing display of a graphical user interface that displays an identifier of the respective episode and an indication of the one or more particular content sources of the set of content sources from which the respective episode is available for playback by the media device; and
  for each content source of the one or more particular content sources:
    determining whether the respective episode is available for playback from the respective content source;
    in response to determining that the respective episode is available for playback from the respective content source, causing display of a content source identifier for the respective content source with a characteristic; and
    in response to determining that the respective episode is not available for playback from the content source, causing display of the content source identifier without the characteristic.

11. The one or more non-transitory computer-readable storage media of claim 10, wherein the graphical user interface further indicates, for the respective episode of the plurality of episodes, that the respective episode has been recorded and is stored locally by the media device.

12. The one or more non-transitory computer-readable storage media of claim 10, further comprising:
  receiving a selection of a particular episode of the plurality of episodes; and
  causing display of a separate icon representing each content source of the set of content sources from which the particular episode is available for playback by the media device.

13. The one or more non-transitory computer-readable storage media of claim 10, further comprising:
  determining that the respective episode is available from one or more broadband content sources;
  in response to determining that the respective episode is available from the one or more broadband content sources, determining that the respective episode is no longer available from at least one broadband content source of the one or more broadband content sources; and
  causing display of an alert indicating that the respective episode is no longer available from the at least one broadband content source of the one or more broadband content sources.

14. The one or more non-transitory computer-readable storage media of claim 10, further comprising recording, by the media device, at least one episode of the plurality of episodes for storage by the media device.

15. The one or more non-transitory computer-readable storage media of claim 10, further comprising causing recording of the respective episode of the show for storage by a cloud storage system.

16. The one or more non-transitory computer-readable storage media of claim 10, further comprising:
  causing recording, by the media device, the respective episode of the show for storage by a cloud storage system;
  wherein the graphical user interface displays an indicating that the respective episode is stored by the cloud storage system.

17. The one or more non-transitory computer-readable storage media of claim 10, wherein the one or more broadband content sources comprise broadband content sources configured by a user of the media device.

18. The one or more non-transitory computer-readable storage media of claim 10, further comprising:
  determining a media content collection includes one or more episodes that are not currently available from any of the one or more broadband content sources;
  monitoring the one or more broadband content sources for the availability of any of the one or more episodes; and
  in response to detecting the availability of any of the one or more episodes, causing display of an alert.

19. An apparatus, comprising:
  a subsystem, implemented at least partially in hardware, that receives, by a media device, a request to retrieve information for a plurality of episodes, subject to a requirement relating to a selected season;
  a subsystem, implemented at least partially in hardware, that, for each episode of the plurality of episodes from the selected season and subsequent seasons:
    determines whether the respective episode having the respective type is available from one or more content sources of a set of content sources, the set of content sources including both broadcast content sources and broadband content sources;
  a subsystem, implemented at least partially in hardware, that causes display of a graphical user interface that displays an identifier of the respective episode and an indication of content sources of the set of content sources from which the respective episode is available for playback by the media device; and
  a subsystem, implemented at least partially in hardware, that, for each content source of the one or more particular content sources:
    determines whether the respective episode is available or unavailable for playback from the content source;
    in response to determining that the respective episode is available for playback from the content source, causes display of a first content source identifier with characteristic; and
    in response to determining that the respective episode is not available for playback from the content source, causing display of the content source identifier without the characteristic.

20. The apparatus of claim 19, wherein the graphical user interface further indicates, for the respective episode of the plurality of episodes, that the respective episode has been recorded and is stored locally by the media device.

21. The apparatus of claim 19, further comprising:
  a subsystem, implemented at least partially in hardware, that receives a selection of a particular episode of the plurality of episodes; and
  a subsystem, implemented at least partially in hardware, that causes display of a separate icon representing each content source of the set of content sources from which the particular episode is available for playback by the media device.

22. The apparatus of claim 19, further comprising:
  a subsystem, implemented at least partially in hardware, that determines that the respective episode is available from one or more broadband content sources;

a subsystem, implemented at least partially in hardware, that subsequent to determining that the respective episode is available from one or more broadband content sources, determines that the respective episode is no longer available from at least one broadband content source of the one or more broadband content sources; and a subsystem, implemented at least partially in hardware, that causes display of an alert indicating that the respective episode is no longer available from the at least one broadband content source of the one or more broadband content sources.

23. The apparatus of claim 19, further comprising a subsystem, implemented at least partially in hardware, that records, by the media device, at least one episode of the plurality of episodes for storage by the media device.

24. The apparatus of claim 19, further comprising a subsystem, implemented at least partially in hardware, that causes recording of the respective episode of the show for storage by a cloud storage system.

25. The apparatus of claim 19, further comprising:

a subsystem, implemented at least partially in hardware, that causes recording, by the media device, the respective episode of the show for storage by a cloud storage system;

wherein the graphical user interface displays an indicating that the respective episode is stored by the cloud storage system.

26. The apparatus of claim 19, wherein the one or more broadband content sources comprise broadband content sources configured by a user of the media device.

27. The apparatus of claim 19, further comprising:

a subsystem, implemented at least partially in hardware, that determines a media content collection includes one or more episodes that are not currently available from any of the one or more broadband content sources;

a subsystem, implemented at least partially in hardware, that monitors the one or more broadband content sources for the availability of any of the one or more episodes; and a subsystem, implemented at least partially in hardware, that in response to detecting the availability of any of the one or more episodes, causes display of an alert.

\* \* \* \* \*